United States Patent
Zimmermann et al.

(10) Patent No.: US 11,874,535 B2
(45) Date of Patent: Jan. 16, 2024

(54) MODULATING A WORKING BEAM OF AN ADDITIVE MANUFACTURING MACHINE WITH A SOLID-STATE OPTICAL MODULATOR

(71) Applicant: Concept Laser GmbH, Lichtenfels (DE)

(72) Inventors: Maik Zimmermann, Stegaurach (DE); Florian Bechmann, Lichtenfels (DE)

(73) Assignee: Concept Laser GmbH, Lichtenfels (DE)

( * ) Notice: Subject to any disclaimer, the term of this patent is extended or adjusted under 35 U.S.C. 154(b) by 54 days.

(21) Appl. No.: 17/385,091

(22) Filed: Jul. 26, 2021

(65) Prior Publication Data
US 2023/0031852 A1 Feb. 2, 2023

(51) Int. Cl.
*G02F 1/03* (2006.01)
*G02F 1/01* (2006.01)
(Continued)

(52) U.S. Cl.
CPC ............ *G02F 1/0327* (2013.01); *B22F 10/28* (2021.01); *B22F 12/43* (2021.01); *B23K 26/064* (2015.10);
(Continued)

(58) Field of Classification Search
CPC ....... G02F 1/00; G02F 2202/00; B33Y 10/00; B33Y 30/00; B23K 26/00; B29C 64/00; B22F 12/00; B22F 10/00
(Continued)

(56) References Cited

U.S. PATENT DOCUMENTS

| | | |
|---|---|---|
| 3,625,592 A | 12/1971 | Beasley |
| 5,043,744 A | 8/1991 | Fantuzzo et al. |

(Continued)

FOREIGN PATENT DOCUMENTS

| | | |
|---|---|---|
| CN | 104294353 A | 1/2015 |
| CN | 106498387 A | 3/2017 |
| JP | 2016045312 A | 4/2016 |

OTHER PUBLICATIONS

Chang, Field-Induced and Nanodisordered KTN Crystals: Properties, Devices, and Applications, The Pennsylvania State University Electrical Engineering Dissertation, 2014, 126 Pages.
(Continued)

*Primary Examiner* — Joseph P Martinez
*Assistant Examiner* — Grant A Gagnon
(74) *Attorney, Agent, or Firm* — Dority & Manning, P.A.

(57) ABSTRACT

An irradiation device for an additively manufacturing apparatus may include a working beam generation device configured to provide a working beam, a modulation beam generation device configured to provide a modulation beam, and a solid-state optical modulator that includes a crystalline material that exhibits a change in refractive index in response to photoexcitation of free electrons within the crystalline material. The irradiation device may include a power source coupled to the solid-state optical modulator and configured to introduce free electrons into the crystalline material. The modulation beam may cause photoexcitation of the free electrons within the crystalline material. The photoexcitation of the free electrons within the crystalline material may cause the crystalline material to exhibit a change in refractive index. The working beam, when incident upon the crystalline material, may exhibit a change in one or more parameters, such as a phase shift, attributable at
(Continued)

least in part to the change in refractive index exhibited by the crystalline material.

18 Claims, 16 Drawing Sheets

(51) Int. Cl.
| | |
|---|---|
| B33Y 30/00 | (2015.01) |
| B33Y 10/00 | (2015.01) |
| B23K 26/354 | (2014.01) |
| B29C 64/153 | (2017.01) |
| B29C 64/268 | (2017.01) |
| B22F 12/43 | (2021.01) |
| B22F 10/28 | (2021.01) |
| B28B 1/00 | (2006.01) |
| B23K 26/06 | (2014.01) |
| B23K 26/067 | (2006.01) |
| B23K 26/064 | (2014.01) |
| B23K 26/0622 | (2014.01) |
| B22F 12/49 | (2021.01) |

(52) U.S. Cl.
CPC ........ *B23K 26/0604* (2013.01); *B23K 26/067* (2013.01); *B23K 26/0622* (2015.10); *B23K 26/354* (2015.10); *B28B 1/001* (2013.01); *B29C 64/153* (2017.08); *B29C 64/268* (2017.08); *B33Y 10/00* (2014.12); *B33Y 30/00* (2014.12); *B22F 12/49* (2021.01); *G02F 2202/06* (2013.01)

(58) Field of Classification Search
USPC .......................................................... 359/240
See application file for complete search history.

(56) References Cited

U.S. PATENT DOCUMENTS

| | | | |
|---|---|---|---|
| 6,560,001 | B1 | 5/2003 | Igasaki et al. |
| 8,620,117 | B2 * | 12/2013 | Nakagawa .............. G02F 1/035 359/245 |
| 10,583,484 | B2 | 3/2020 | DeMuth et al. |
| 2005/0090378 | A1 | 4/2005 | Li et al. |
| 2017/0120529 | A1 | 5/2017 | DeMuth et al. |
| 2017/0304944 | A1 | 10/2017 | Symeonidis et al. |
| 2020/0198060 | A1 | 6/2020 | Bayramian et al. |

OTHER PUBLICATIONS

Chang et al., Kovacs Effect Enhanced Broadband Large Field of View Electro-optic Modulators in Nanodisordered KTN Crystals, Optics Express 17760, vol. 21, No. 15, 2013, 9 Pages.
Chapter 5, 3rd Order Non-Linear Optical Interactions, 5.4 Optical Kerr Effect, p. 46-52. Retrieved from Webpage: http://paristech.institutoptique.fr/site.php?id=225&fileid=20963.
Chen, Optical Beam Scanning Using Potassium Tantalate Niobate, University of Dayton Thesis, Dayton Ohio, 2015, 57 Pages.
Clarke, Techniques for Laser Combining, Electro-Optical Systems Engineering, LumOptica Innovations in Light, 13 Pages.
Dam-Hansen, Magnetophotorefractive Effect and Interference Filters in Lithium Niobate, Riso-R-880(EN), DK9600055, vol. 27, No. 13, Riso National Labroratory, Roskilde Denmark, Mar. 1996, 91 Pages. https://inis.iaea.org/collection/NCLCollectionStore/_Public/27/046/27046742.pdf.
Eisenhauer et al., Smooth Anti-Reflective Three-Dimensional Textures for Liquid Phase Crystallized Silicon Thin-Film Solar Cells on Glass, Scientific Reports, vol. 7, Article No. 2658, Jun. 2017, 10 Pages. https://doi.org/10.1038/s41598-017-02874-y.
Hamamatsu Photonics, LCOS—Spatial Light Modulators, 3 Pages. Retrieved Jun. 29, 2020 from https://lcos.hamamatsu.com/jp/en/index.html.
Imai et al., Crystal Growth and Electro-Optic Properties of KTa1-xNbxO3, Selected Papers: Growth Technologies and Device, NTT Technical Review, vol. 5, No. 9, Sep. 2007, 8 Pages.
Khan et al., Determination of Electro-Optic Tensor Coefficients of Organic Thin Film using Fabry-Parot Interferometric Set-up, KTH Information and Communication Technology, TRITA-ICT-EX-2013:242, Thesis, Stockholm Sweden, 2013, 38 Pages.
Kim et al., Comparison of PMN-PT and PZN-PT Single-Crystal-Based Ultrasonic Transducers for Nondestructive Evaluation Applications, Sensors and Materials, vol. 27, No. 1, MY Tokyo, 2015, pp. 107-114.
Leyva et al., Increased Photorefractive Sensitivity in Double-Doped KTa1-xNBxO3:Fe,Ti, Optics Letters, vol. 18, No. 12, Jun. 15, 1993, pp. 959-961.
McManamon et al., Progress and Opportunities in the Development of Nonmechanical Beam Steering for Electro-Optical Systems, Optical Engineering, vol. 58, Issue 12, 120901, 2019, 16 Pages. https://doi.org/10.1117/1.OE.58.12.120901.
Meadowlark Optics, Polarization Solutions, Linear Series Spatial Light Modulator, LCoS Reflective Spatial Light Modulators, Linear Series Spatial Light Modulator, Colorado, 4 Pages. Retrieved Jun. 29, 2020 from https://www.meadowlark.com/linear-series-spatial-light-modulator-p-121?mid=18.
Metallic Mirror Coatings, Edmund Optics Worldwide, Knowledge Center, Application Notes, Optics, Metallic Mirror Coatings, 2019, 9 Pages. https://www.edmundoptics.com/knowledge-center/application-notes/optics/metallic-mirror-coatings/.
Pockels Readout Optical Modulator, Principle Operating, PROM-020, Sillenites Ltd, 2019, 2 Pages. http://sillenites.ru/products/devices/prom-020/.
Prados et al., The Kovacs effect: a master equation analysis, Condensed Matter, Statistical Mechanics, J. Stat. Mech. P02009, 2010, pp. 1-30. http://arxiv.org/abs/0911.4015v2.
Raut et al., Anti-Reflective Coatings: A Critical, In-Depth Review, Energy & Environmental Science, vol. 4, 2011, 27 pages. http://pubs.rsc.org https://pubs.rsc.org/en/content/articlelanding/2011/ee/clee01297e/unauth#!divAbstract.
Sillenites Ltd, Optically Addressed Spatial Light Modulators, Pockels Readout Optical Modulator—PROM, Russia, Feb. 2019, 7 Pages. http://sillenites.ru/wp-content/uploads/2019/02/PROM.pdf.
Sillenites Ltd, Pockels Readout Optical Modulator, PROM-020, Principle Operating, 2 Pages. Retrieved Jun. 29, 2020 from http://sillenites.ru/products/devices/prom-020/.
Toyoda et al., Injected-Charge-Driven increase in Electro-Optic Effect of KTN Crystals, AIP Advances, vol. 4, 057109, 2014, 7 Pages. https://doi.org/10.1063/1.4876237.
Varifocal Lens, NTT Advanced Technology Corporation (NTTAT), KTN and Innovative Optics, 7 Pages. Retrieved from Webpage: https://www.ntt-at.com/product/vari-focal_lens/.
Wang et al., Giant Electro-Optic Effect in Nanodisordered KTN Crystals, Optics Letters, ResearchGate, vol. 38, No. 22, Nov. 15, 2013, pp. 4574-4577.
Willey, Thin-Film Coatings: Understanding Key Design Principles of Antireflection Coatings, LaserFocus World, Oct. 13, 2016, 8 Pages. https://www.laserfocusworld.com/optics/article/16547029/thinfilm-coatings-understanding-key-design-principles-of-antireflection-coatings.
Xu et al., Experimental Observation of Non-Linear Mode Conversion in Few-Mode Fiber, Optical Society of America, 2015, 2 Pages.
Yagi et al., Electro-Optic KTN Devices, 8th International Conference on Photonic Technologies LANE 2014, Physics Procedia, Science Direct, vol. 56, 2014, pp. 40-47.
Yagi, KTN Crystals Open up New Possibilities and Applications, KTN Crystal Technologies, NTT Technical Review, vol. 7, No. 12, Japan, Dec. 2009, 5 Pages.
Yang et al., Electro-Optic Intensity Modulation in Fe-Doped KTa0.65Nb0.35O3 Crystals, Cryst10100870 vol. 10, 870, 2020, 9 Pages.
Zhang, Chapter 3, Electro-optic Properties of II-VI Semiconductor Nano-clusters and Electro-optic Chromophores, Virginia Tech, Sep. 26, 2002, pp. 69-134. https://vtechworks.lib.vt.edu/handle/10919/

(56) References Cited

OTHER PUBLICATIONS 29289 https://vtechworks.lib.vt.edu/bitstream/handle/10919/29289/05Chapter_3.pdf?sequence=2&isAllowed=y.

Zhu et al., Three Order Increase in Scanning Speed of Space Charge-Controlled KTN Deflector by Eliminating Electric Field Induced Phase Transition in Nanodisordered KTN, Scientific Reports, vol. 6, Article No. 33143, Sep. 9, 2016, 10 Pages.

Anonymous, "Electro-optic modulator—Wikipedia", Dec. 31, 2015, Retrieved from Internet: https://en.wikipedia.org/wiki/Electro-optic_modulator.

"Key for Discoveries", 4Lasers, Optogama, 2021, Retrieved from internet: https://4lasers.com/en/components/crys%20tals/photorefractive-crystals/bso-crystals.

Lu et al., "Temperature dependence of Kerr coefficient and quadratic polarized optical coefficient of a paraelectric Mn:Fe:KTN crystal", AIP Advances, American Institute of Physics, vol. 5, No. 8, New York, Aug. 6, 2015.

Lv et al., "A modulation efficiency enhancement method of KTN electro-optic modulator in laser 3D imaging", Optical and Quantum Electronics, vol. 54, No. 1, New York, Dec. 28, 2021 (Abstract Only).

Matthews et al., "Diode-based additive manufacturing of metals using an optically-addressable light valve", Optics Express, vol. 25, No. 10, May 15, 2017.

\* cited by examiner

MODULATING A WORKING BEAM OF AN ADDITIVE MANUFACTURING MACHINE WITH A SOLID-STATE OPTICAL MODULATOR

FIELD

The present disclosure generally pertains to irradiation devices for irradiating powder material to additively manufacture three-dimensional objects, such as irradiation devices used in powder bed fusion processes.

BACKGROUND

Three dimensional objects may be additively manufactured using a powder bed fusion process in which an energy beam is directed onto a powder bed to melt and/or sinter sequential layers of powder material. The properties of the three dimensional object formed by melting and/or fusing the powder material may depend at least in part on one or more parameters of the energy beam. Additionally, or in the alternative, one or more parameters of an energy beam may impact operating parameters such as processing speed of the powder bed fusion process. Accordingly, it would be welcomed in the art to provide improved additive manufacturing systems and machines, including improved energy beam systems that allow for one or more parameters of an energy beam to be adjusted and/or controlled.

BRIEF DESCRIPTION OF THE DRAWINGS

A full and enabling disclosure, including the best mode thereof, directed to one of ordinary skill in the art, is set forth in the specification, which makes reference to the appended Figures, in which.

Figure 1:
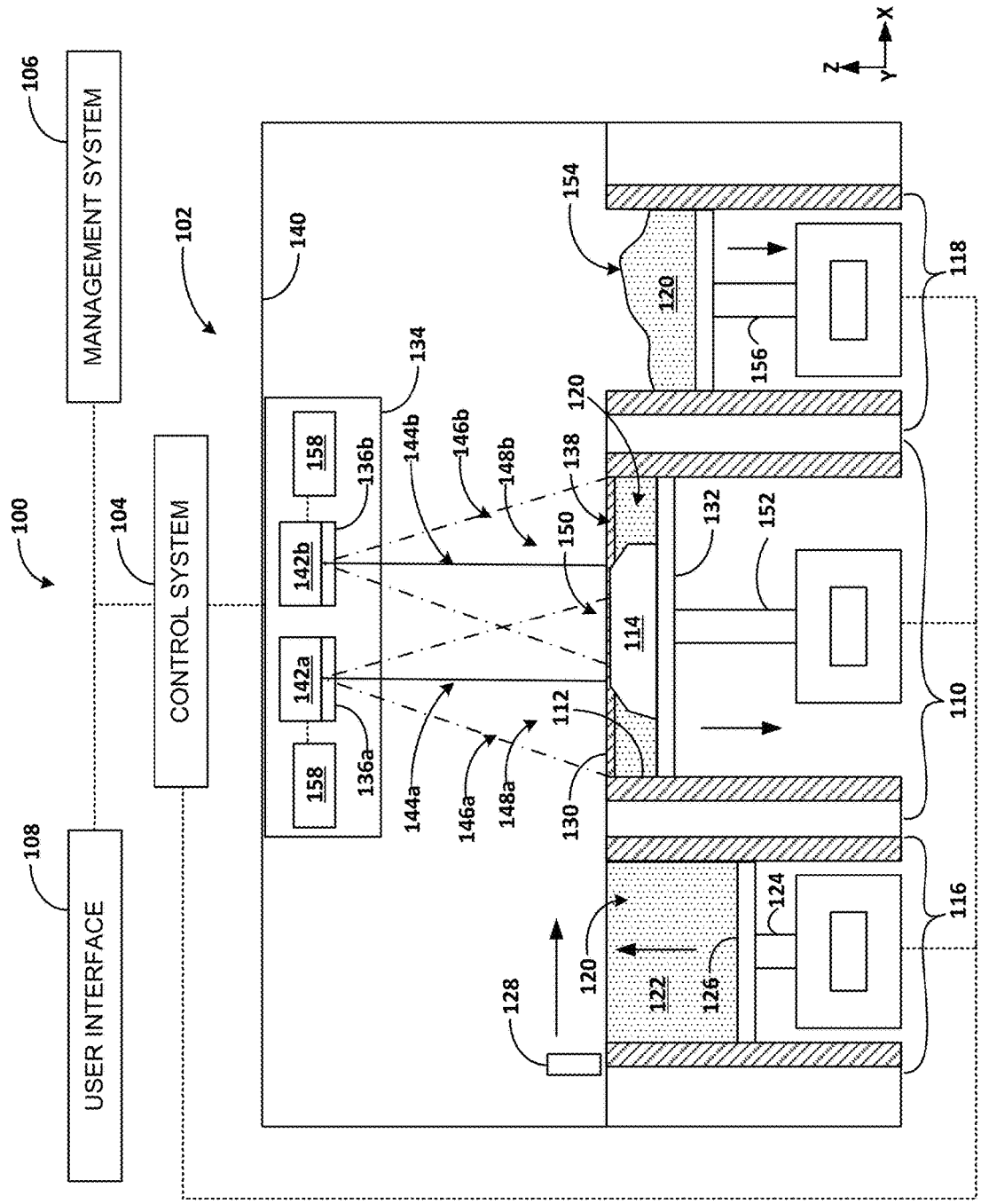
FIG. 1 schematically depicts an exemplary additive manufacturing system or machine.

Repeat use of reference characters in the present specification and drawings is intended to represent the same or analogous features or elements of the present disclosure.

DETAILED DESCRIPTION

The presently disclosed subject matter will now be described in further detail, in some instances with reference to one or more of the drawings. Examples are provided by way of explanation and should not be interpreted as limiting the present disclosure. In fact, it will be apparent to those skilled in the art that various modifications and variations can be made in the present disclosure without departing from the scope of the present disclosure. For instance, features illustrated or described in one portion of the present disclosure can be used with features illustrated or described in another portion of the present disclosure, including with modification and variations thereof. It is intended that the present disclosure covers such modifications and variations as come within the scope of the appended claims and their equivalents.

The present disclosure generally provides energy beam systems, such as for powder bed fusion processes, that allow for one or more parameters of an energy beam to be augmented and/or controlled when additively manufacturing three-dimensional objects. The parameters of the energy beam may be augmented and/or controlled using a solid-state optical modulator. The solid-state optical modulator may include a crystalline material that exhibits a change in refractive index in response to free electrons introduced by a power source and/or in response to photoexcitation of the crystalline material, such as photoexcitation of free electrons within the crystalline material. Without being bound to any particular theory in physics, photoexcitation generally refers to the production of an excited state of a quantum system by photon absorption, including, for example, electron excitation. The excited state may be attributable at least in part to interactions between phonons and the quantum system, such as interactions between photons and free electrons. Photoexcitation may also include an excited state attributable to interactions between photons and other subatomic particles, dopants, and/or photocatalysts. Additionally, or in the alternative, photoexcitation may include generation of electron-hole pairs and/or free radicals, as well as secondary interactions related thereto. When the energy beam passes through a region of the crystalline material exhibiting photoexcitation, the change in refractive index attributable to the photoexcitation may impart a change to one or more parameters of the energy beam.

The presently disclosed energy beam systems may utilize a modulation beam that exhibits a relatively low power level to modulate the crystalline material of the solid-state optical modulator, while a working beam that has a relatively high power level may be directed through the crystalline material and used to irradiate powder material to form a three-dimensional object. The crystalline material may be photo-excited by the modulation beam, causing a change in refractive index of the crystalline material that, in turn, may impart a change to one or more parameters of the working beam upon passing through the crystalline material. As such, the working beam may be augmented and/or controlled indirectly using the relatively low-power modulation beam.

In an exemplary embodiment, the modulation beam may be modulated using a structured light modulator. An active portion of the modulation beam may become incident upon a modulation region of the crystalline material. The portion of the working beam that becomes incident upon the modulated portion of the crystalline material may exhibit a phase shift relative to a nominal portion of the working beam that becomes incident upon a nominal region of the crystalline material. The phase shift may allow the modulated portion of the working beam and the nominal portion of the working beam to exhibit superposition relative to one another. The superposition of the modulated portion and the nominal portion of the working beam may augment an intensity of the working beam at a zone of incidence of the working beam upon the powder material. The phase shift and/or superposition may allow the intensity of the working beam to be augmented without requiring amplitude modulation of the working beam, which would otherwise generate significant waste heat from the amplitude-modulated or inactive portion of the working beam. The modulation of the working beam realized by the present disclosure may allow one or more parameters of the working beam to be augmented and/or controlled, for example, to provide improved process performance, faster production times, improved energy usage, and quality improvements to additively-manufactured components.

The solid-state optical modulator may include a crystalline material that exhibits a change in refractive index in response to photoexcitation of free electrons within the crystalline material. Exemplary crystalline materials may exhibit an electro-optic effect that includes a change in refractive index in response to an electric field. The electro-optic effect may include a Kerr effect, which is sometimes referred to as a quadratic electro-optic effect. The Kerr effect, or the quadratic electro-optic effect, refers to a change in refractive index proportional to a square of the electric field. The Kerr effect is distinct from the Pockels effect, which refers to a change in refractive index in linear proportion to the electric field. The Pockels effect occurs in non-centrosymmetric materials. The Kerr effect may be described by the following relationship: $\Delta n(E) \approx \frac{1}{2} k \cdot n^3 \cdot E^2$, where (E) is the electric field, (k) is a Kerr coefficient, and (n) is the refractive index. The Kerr coefficient, (k) may be described for a tensor set $s_{ij}$, such as the $s_{11}$ tensor, by the following relationship: $s_{11} = g_{11}(\varepsilon - \varepsilon_0)^2 = g_{11}\varepsilon_0^2(\varepsilon_r - 1)^2$, where $\varepsilon$ is the permittivity, $\varepsilon_0$ is the vacuum permittivity, $\varepsilon_r$ is the relative dielectric constant, $g_{11}$ is a function of the wavelength of the light. The relative dielectric constant, $\varepsilon_r$ is may be described according to the Curie-Weiss law, as follows:

$$\varepsilon_r = \frac{1}{T - T_c},$$

where $T_c$, is the Curie temperature. Thus, for a crystalline material that exhibits the Kerr effect, the relative dielectric constant, $\varepsilon_r$ increases significantly as the temperature approaches the Curie temperature, $T_c$. The Kerr coefficient can be measured using a Mach-Zehnder interferometer.

In some embodiments, the crystalline material may exhibit a perovskite-type structure that has the general chemical formula $ABO_3$, where "A" refers to a first atom, "B" refers to a second atom, and "O" refers to oxygen. The perovskite-type structure may be transparent and/or semi-transparent at a wavelength range of interest. One exemplary perovskite-type crystalline material is potassium tantalate niobate (sometimes referred to as "KTN"), which is a solid solution of potassium niobate ($KNbO_3$) and potassium tantalate ($KTaO_3$) that has the chemical formula $K(Ta_{1-x}Nb_x)O_3$. The proportion of niobate (Nb) and tantalate (Ta) may be selected according to the desired properties of the KTN and/or according to the desired operating conditions of the crystalline material. By way of example, KTN may be described by the chemical formula: $KTa_{0.7}Nb_{0.3}O_3$, or $KTa_{0.65}Nb_{0.35}O_3$, or $KTa_{0.63}Nb_{0.37}O_3$, or $KTa_{0.59}Nb_{0.41}O_3$. Other exemplary perovskite-type crystalline materials include lithium niobate, which may exhibit the chemical formula $LiNbO_3$, and which is sometimes referred to as "LN;" lead lanthanum zirconate titanate, which may be described by the chemical formula $Pb_{1-x}La_x(Zr_yTi_{1-y})_{1-x/4}O_3$, and which is sometimes referred to as "PLZT;" lead magnesium niobate-lead titanate, which may be described by the chemical formula $Pb(Mg_{1/3}Nb_{2/3})O_3$—$PbTiO_3$, and which is sometimes referred to as "PMN-PT;" lead zinc niobate-lead titanate, which may be described by the chemical formula $Pb(Zn_{1/3}Nb_{2/3})O_3$—$PbTiO_3$, and which is sometimes referred to as "PZN-PT;" lead scandium niobate-lead titanate, which may be described by the chemical formula $Pb(Sc_{1/2}Nb_{1/2})O_3$—$PbTiO_3$, and which is sometimes referred to as PSN-PT; among others, as well as combinations of these. In some embodiments, the perovskite-type crystalline material may be doped with a metal element and/or a rare-earth element to provide a doped perovskite-type crystalline material. By way of illustration, exemplary dopants may include iron (Fe), manganese (Mn), samarium (Sm), or Erbium (Er), titanium (Ti), copper (Cu), and so forth.

In some embodiments, the perovskite-type structure of the crystalline material, such as KTN, may be provided in a cubic phase. Other crystalline phases are also contemplated. The cubic phase of perovskite-type structures, such as KTN, may advantageously exhibit a centrosymmetric crystalline structure, or inversion symmetry. As a result, the cubic phase of perovskite-type crystalline materials, such as KTN, generally does not exhibit a Pockels effect. The Kerr effect may be the dominant electro-optic effect exhibited by perovskite-type crystalline materials, such as KTN, in the cubic phase. In the cubic phase, a cubic unit cell of a perovskite-type crystalline material that has the general chemical formula $ABO_3$, may include the type "A" atom located at cube corner position (0, 0, 0), the type "B" atom located at the body-center position (1/2, 1/2, 1/2) and oxygen atoms located at face centered positions (1/2, 1/2, 0), (1/2, 0, 1/2) and (0, 1/2, 1/2). In other embodiments a perovskite-type crystalline material, such as KTN, may be provided in a non-cubic phase, such as a tetragonal phase, an orthorhombic phase, and/or rhombohedral phase.

Exemplary a perovskite-type crystalline materials, such as KTN, may exhibit a cubic phase above the Curie temperature, $T_c$. For example, perovskite-type crystalline materials, such as KTN, may exhibit a phase transition at the Curie temperature, from a tetragonal phase to a cubic phase. At increasingly lower temperatures, the perovskite-type crystalline material may exhibit an orthorhombic phase, followed by a rhombohedral phase. Generally, perovskite-type crystalline materials exhibit ferroelectric properties below the Curie temperature and paraelectric properties above the Curie temperature. The crystalline material may exhibit ferroelectric properties below the Curie temperature, such as in the tetragonal phase. The crystalline material may exhibit paraelectric properties above the Curie temperature, such as in the cubic phase. In some embodiments, a perovskite-type crystalline material, such as KTN, may exhibit the strongest Kerr effect near the Curie temperature, such as near the phase transition temperature for the cubic phase.

By way of illustration, the phase transition temperature of KTN between the tetragonal phase and the cubic phase may depend at least in part on the proportion of niobate (Nb) relative to the proportion of tantalate (Ta) in the KTN material. In some embodiments, the phase transition temperature of KTN (e.g., the Curie temperature) can be described by the following relationship: $T_c = 676x - 241$ C, where x is the mole concentration ratio of niobate (Nb), which can be described as: Nb/(Nb+Ta). Any mole concentration ratio of niobate (Nb) may be selected. In some embodiments, a mole concentration ratio of niobate (Nb) may be selected based at least in part on a correspondingly suitable Curie temperature. For example, the mole concentration ratio of niobate (Nb) may be selected from within a range of from about 0.3 to about 0.7, such as from about 0.4 to about 0.6, or from about 0.35 to about 0.50. The Curie temperature of KTN corresponding to the aforementioned exemplary ranges may be from about −38 C to about 234 C, such as from about −29 C to about 165 C, such as from about −4 C to about 79 C. A suitable Curie temperature may be realized by selecting a corresponding mole concentration ratio of niobate (Nb). In some embodiments, a suitable Curie temperature may be selected based at least in part on the intended operating temperature of the crystalline material. Additionally, or in the alternative, the crystalline material may be temperature-controlled by way of heating and/or cooling so as to maintain the crystalline material at a desired operating temperature. For example, the crystalline material may exhibit an operating temperature that is in the cubic phase, such as in the cubic phase near the Curie temperature, with or without temperature-control as may be suitable for the intended operating conditions.

The relative permittivity of crystalline material that exhibits a perovskite-type structure, such as KTN, may depend at least in part on the temperature of the crystalline material. For example, the relative permittivity may peak as the temperature approaches the Curie temperature. For KTN, the relative permittivity may be from about $5 \times 10^3$ to about $50 \times 10^3$ as the temperature of the KTN approaches the Curie temperature. Additionally, or in the alternative, the relative permittivity of KTN may depend at least in part on the mole concentration ratio of niobate (Nb). For example, for a mole concentration ratio of 0.2, the relative permittivity may be from about $5 \times 10^3$ to about $50 \times 10^3$. As further examples, for a mole concentration ratio of about 0.4, the relative permittivity may be from about $5 \times 10^3$ to about $25 \times 10^3$; and for a mole concentration ratio of about 0.5, the relative permittivity may be from about $5 \times 10^3$ to about $15 \times 10^3$.

The Kerr coefficient, (k), of a crystalline material may be determined, such as for tensors $s_{11}$-$s_{12}$, from a half-wave voltage, $V_\pi$, using an electric field oriented parallel to the direction of light propagation through the crystalline material, according to the following relationship: $s_{11}-s_{12}=\lambda t/n^3 V_\pi^2$, where (t) is the thickness of the crystalline material, and (n) is the refractive index of the crystalline material. Likewise, a half-wave voltage for a crystalline material that exhibits a known Kerr coefficient may be determined from the foregoing relationship. By way of example, the Kerr coefficient (k) for KTN may be from about $1 \times 10^{-15}$ m$^2$/V$^2$ to about $1 \times 10^{-13}$ m$^2$/V$^2$, such as from about $1 \times 10^{-14}$ m$^2$/V$^2$ to about $1 \times 10^{-13}$ m$^2$/V$^2$, or such as from about $2 \times 10^{-14}$ m$^2$/V$^2$ to about $8 \times 10^{-14}$ m$^2$/V$^2$.

A perovskite-type crystalline material, such as KTN, may be produced using a top-seed solution growth (TSSG) process. Suitable TSSG processes may yield colorless, optical-quality single crystal KTN. Other technologies are also contemplated and may be selected depending on the perovskite-type crystalline material, including Czochralski growth processes, Kyropoulos growth processes, sol-gel processes, sputtering processes, uniaxial hot-press systems, and so forth.

A crystalline material that has a perovskite-type structure, such as KTN, may exhibit a Kovacs effect. The Kovacs effect refers to one or more properties of the crystalline material at a given temperature being dependent on the thermal history of the crystalline material. According to the Kovacs effect, perovskite-type crystalline material, such as KTN, may remember it thermal deformation history. For example, the Kovacs effect may include one or more properties being different at a given temperature depending on whether the crystalline material has undergone a heating process or a cooling process. In some embodiments, the Kovacs effect may include an enhanced Kerr effect. For example, KTN material may exhibit an enhanced Kerr effect when the KTN material has been rapidly cooled from an elevated temperature.

A crystalline material that has a perovskite-type structure, such as KTN, may include polar nanoregions when at a temperature that is above the Curie temperature but below the Burns temperature, $T_b$. The Burns temperature refers to the temperature at which the crystalline material starts to present polar nanoregions. Above the Burns temperature, the polar nanoregions generally have a disordered arrangement. The polar nanoregions may include nano-scale sized regions (e.g., from about 1 to 30 nanometers) that exhibit polarization as a precursor to a phase change from a paraelectric structure to a ferroelectric structure. Such polar nanoregions may minimize optical depolarization and scattering when they have a suitably small nano-scale size and/or a suitably nano-disordered arrangement in the crystalline material. As the temperature decreases from the Burns temperature to the Curie temperature, the polar nanoregions may combine to form larger scale superclusters of polar regions, which may cause depolarization and/or scattering of light. In some embodiments, Kerr coefficient (k) may be enhanced by the Kovacs effect exhibited by perovskite-type crystalline materials, such as KTN, for example, by providing polar nanoregions of a suitably small nano-scale and/or of a suitably nano-disordered arrangement. For KTN, the Kovacs effect may enhance the Kerr coefficient by a factor of from about 2× to about 10×, such as from about 2× to about 8×.

The size of polar nanoregions and/or their arrangement in the crystalline material may be influenced by heating the crystalline material to a temperature well above the Curie temperature, and then rapidly cooling the crystalline material, such as according to a controlled rate of cooling. The polar nanoregions may exhibit a relatively smaller nano-scale size when the crystalline material is cooled at a relatively rapid rate. Additionally, or in the alternative, the polar nanoregions may exhibit a nano-disordered arrangement within the crystalline material when the crystalline material is cooled at a rapid rate. By way of example, to provide suitably small polar nanoregions, and/or nano-disordered polar nanoregions, the crystalline material may be heated to well above the Curie temperature, such as from about 10 C to about 30 C above the Curie temperature, or such as from about 15 C to 20 C above the Curie temperature, and then cooled at a rate of from about 0.1 C/sec to about 1.0 C/sec, such as from about 0.2 C/sec to about 6.0 C/sec. Additionally, or in the alternative, the crystalline material may be cooled from above the Curie temperature at a suitably rapid rate when initially forming the crystalline material, such as using a TSSG process. To avoid depolarization and/or light scattering, polar nanoregions that have a cross-section that is less than the wavelength of light intended to be transmitted by the crystalline material may be desired. When the polar nanoregions have a cross-section that is less than the wavelength of light transmitted by the crystalline material, depolarization and/or light scattering by the polar nanoregions may be negligible. For perovskite-type crystalline materials, such as KTN, that exhibit a Kovacs effect, if the crystalline material has not been rapidly cooled as described herein, or if the crystalline material exhibits undesired depolarization and/or scattering, the crystalline material may be reheated to above the Curie temperature and rapidly cooled to introduce nano-disordered polar nanoregions. This process may be repeated as necessary.

As described herein, the presently disclosed subject matter involves the use of additive manufacturing machines or systems. As used herein, the term "additive manufacturing" refers generally to manufacturing technology in which components are manufactured in a layer-by-layer manner. An exemplary additive manufacturing machine may be configured to utilize any desired additive manufacturing technology. The additive manufacturing machine may utilize an additive manufacturing technology that includes a powder bed fusion (PBF) technology, such as a direct metal laser melting (DMLM) technology, a selective laser melting (SLM) technology, a directed metal laser sintering (DMLS) technology, or a selective laser sintering (SLS) technology. In an exemplary PBF technology, thin layers of powder material are sequentially applied to a build plane and then selectively melted or fused to one another in a layer-by-layer manner to form one or more three-dimensional objects. Additively manufactured objects are generally monolithic in nature and may have a variety of integral sub-components.

Additionally or alternatively suitable additive manufacturing technologies include, for example, Fused Deposition Modeling (FDM) technology, Direct Energy Deposition (DED) technology, Laser Engineered Net Shaping (LENS) technology, Laser Net Shape Manufacturing (LNSM) technology, Direct Metal Deposition (DMD) technology, Digital Light Processing (DLP) technology, Vat Polymerization (VP) technology, Stereolithography (SLA) technology, and other additive manufacturing technology that utilizes an energy beam.

Additive manufacturing technology may generally be described as fabrication of objects by building objects point-by-point, layer-by-layer, typically in a vertical direction. Other methods of fabrication are contemplated and within the scope of the present disclosure. For example, although the discussion herein refers to the addition of material to form successive layers, the presently disclosed subject matter may be practiced with any additive manufacturing technology or other manufacturing technology, including layer-additive processes, layer-subtractive processes, or hybrid processes.

The additive manufacturing processes described herein may be used for forming components using any suitable material. For example, the material may be metal, ceramic, polymer, epoxy, photopolymer resin, plastic, concrete, or any other suitable material that may be in solid, liquid, powder, sheet material, wire, or any other suitable form. Each successive layer may be, for example, between about 10 m and 200 m, although the thickness may be determined based on any number of parameters and may be any suitable size.

As used herein, the term "build plane" refers to a plane defined by a surface upon which an energy beam impinges during an additive manufacturing process. Generally, the surface of a powder bed defines the build plane. During irradiation of a respective layer of the powder bed, a previously irradiated portion of the respective layer may define a portion of the build plane, and/or prior to distributing powder material across a build module, a build plate that supports the powder bed generally defines the build plane.

It is understood that terms "upstream" and "downstream" refer to the relative direction with respect to fluid flow in a fluid pathway. For example, "upstream" refers to the direction from which the fluid flows, and "downstream" refers to the direction to which the fluid flows. It is also understood that terms such as "top", "bottom", "outward", "inward", and the like are words of convenience and are not to be construed as limiting terms. As used herein, the terms "first", "second", and "third" may be used interchangeably to distinguish one component from another and are not intended to signify location or importance of the individual components. The terms "a" and "an" do not denote a limitation of quantity, but rather denote the presence of at least one of the referenced item.

Approximating language, as used herein throughout the specification and claims, may be applied to modify any quantitative representation that could permissibly vary without resulting in a change in the basic function to which it is related. Accordingly, a value modified by a term or terms, such as "about," "substantially," and "approximately," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

The presently disclosed subject matter will now be described in further detail. FIG. 1 schematically depicts an exemplary additive manufacturing system 100. The additive manufacturing system 100 may include one or more additive manufacturing machines 102. The one or more additive manufacturing machines 102 may include a control system 104. The control system 104 may be included as part of the additive manufacturing machine 102 or the control system 104 may be associated with the additive manufacturing machine 102. The control system 104 may include componentry integrated as part of the additive manufacturing machine 102 and/or componentry that is provided separately from the additive manufacturing machine 102. Various componentry of the control system 104 may be communicatively coupled to various componentry of the additive manufacturing machine 102.

The control system 104 may be communicatively coupled with a management system 106 and/or a user interface 108. The management system 106 may be configured to interact with the control system 104 in connection with enterprise-level operations pertaining to the additive manufacturing system 100. Such enterprise level operations may include transmitting data from the management system 106 to the control system 104 and/or transmitting data from the control system 104 to the management system 106. The user interface 108 may include one or more user input/output devices to allow a user to interact with the additive manufacturing system 100.

As shown, an additive manufacturing machine 102 may include a build module 110 that includes a build chamber 112 within which an object or objects 114 may be additively manufactured. An additive manufacturing machine 102 may include a powder module 116 and/or an overflow module 118. The build module 110, the powder module 116, and/or the overflow module 118 may be provided in the form of modular containers configured to be installed into and removed from the additive manufacturing machine 102 such as in an assembly-line process. Additionally, or in the alternative, the build module 110, the powder module 116, and/or the overflow module 118 may define a fixed componentry of the additive manufacturing machine 102.

The powder module 116 contains a supply of powder material 120 housed within a supply chamber 122. The powder module 116 includes a powder piston 124 that elevates a powder floor 126 during operation of the additive manufacturing machine 102. As the powder floor 126 elevates, a portion of the powder material 120 is forced out of the powder module 116. A recoater 128 such as a blade or roller sequentially distributes thin layers of powder material 120 across a build plane 130 above the build module 110. A build platform 132 supports the sequential layers of powder material 120 distributed across the build plane 130. A build platform 132 may include a build plate (not shown) secured thereto and upon which an object 114 may be additively manufactured.

The additive manufacturing machine 102 includes an energy beam system 134 configured to generate one or more of energy beams such as laser beams and to direct the respective energy beams onto the build plane 130 to selectively solidify respective portions of the powder bed 138 defining the build plane 130. As the respective energy beams selectively melt or fuse the sequential layers of powder material 120 that define the powder bed 138, the object 114 begins to take shape. The one or more energy beams or laser beams may include electromagnetic radiation having any suitable wavelength or wavelength range, such as a wavelength or wavelength range corresponding to infrared light, visible light, and/or ultraviolet light.

Typically, with a DMLM, EBM, or SLM system, the powder material 120 is fully melted, with respective layers being melted or re-melted with respective passes of the energy beams. With DMLS or SLS systems, typically the layers of powder material 120 are sintered, fusing particles of powder material 120 to one another generally without reaching the melting point of the powder material 120. The energy beam system 134 may include componentry integrated as part of the additive manufacturing machine 102 and/or componentry that is provided separately from the additive manufacturing machine 102.

The energy beam system 134 may include one or more irradiation devices configured to generate a plurality of energy beams and to direct the energy beams upon the build plane 130. The irradiation devices may respectively have an energy beam source, a galvo-scanner, and optical assembly 136 that includes a plurality of optical elements configured to direct the energy beam onto the build plane 130. The optical assembly 136 may include one or more optical elements, such as lenses through which an energy beam may be transmitted along an optical path from the energy beam source to the build plane. By way of example, an optical assembly 136 may include one more focusing lenses that focus an energy beam on a build plane 130. Additionally, or in the alternative, an optical assembly 136 may include a window, such as a protective glass, that separates one or more components of the energy beam system 134 from a process chamber 140 within which powder material is irradiated by one or more energy beams 144 to additively manufacture a three-dimensional object 114. The window or protective glass may include one or more optical elements, such as lenses or panes, through which an energy beam passes along an optical path to the build plane 130. The window or protective glass may separate the one or more components of the energy beam system from conditions existing within the process chamber 140 of an additive manufacturing machine 102. Such window or protective glass may prevent contaminants associated with the additive manufacturing process, such as powder material, dust, soot, residues from fumes or vapor, and the like, from coming into contact with sensitive components of an energy beam system 134. Accumulation of contaminants upon various optical elements of an optical assembly 136 may adversely affect operation of the energy beam system 134 and/or quality metrics associated with an energy beam system. Additionally, or in the alternative, such contaminants may cause damage to various optical elements of an optical assembly 136. The presently disclosed optical element monitoring systems may be configured to monitor various optical elements of an optical assembly 136 for accumulation of contaminants and/or damage. Additionally, or in the alternative, the presently disclosed optical element monitoring systems may be configured to initiate cleaning, maintenance, and/or replacement of various optical elements of an optical assembly 136.

As shown in FIG. 1, the energy beam system 134 includes a first irradiation device 142a and a second irradiation device 142b. The first irradiation device 142a may include a first optical assembly 136a, and/or the second irradiation device 142b may include a second optical assembly 136b. Additionally, or in the alternative, an energy beam system 134 may include three, four, six, eight, ten, or more irradiation devices, and such irradiation devices may respectively include an optical assembly 136. The plurality of irradiation devices 142 may be configured to respectively generate one or more energy beams that are respectively scannable within a scan field incident upon at least a portion of the build plane 130. For example, the first irradiation device 142a may generate a first energy beam 144a that is scannable within a first scan field 146a incident upon at least a first build plane region 148a. The second irradiation device 142b may generate a second energy beam 144b that is scannable within a second scan field 146b incident upon at least a second build plane region 148b. The first scan field 146a and the second scan field 146b may overlap such that the first build plane region 148a scannable by the first energy beam 144a overlaps with the second build plane region 148b scannable by the second energy beam 144b. The overlapping portion of the first build plane region 148a and the second build plane region 148b may sometimes be referred to as an interlace region 150. Portions of the powder bed 138 to be irradiated within the interlace region 150 may be irradiated by the energy beam first energy beam 144a and/or the second energy beam 144b in accordance with the present disclosure.

To irradiate a layer of the powder bed 138, the one or more irradiation devices (e.g., the first irradiation device 142a and the second irradiation device 142b) respectively direct the plurality of energy beams (e.g., the first energy beam 144a and the second energy beam 144b) across the respective portions of the build plane 130 (e.g., the first build plane region 148a and the second build plane region 148b) to melt or fuse the portions of the powder material 120 that are to become part of the object 114. The first layer or series of layers of the powder bed 138 are typically melted or fused to the build platform 132, and then sequential layers of the powder bed 138 are melted or fused to one another to additively manufacture the object 114. As sequential layers of the powder bed 138 are melted or fused to one another, a build piston 152 gradually lowers the build platform 132 to make room for the recoater 128 to distribute sequential layers of powder material 120. The distribution of powder material 120 across the build plane 130 to form the sequential layers of the powder bed 138, and/or the irradiation imparted to the powder bed 138, may introduce contaminants, such as powder material, dust, soot, residues from fumes or vapor, and the like, into the environment of the process chamber 140. Such contaminants may accumulate on various optical elements of the optical assembly 136 associated with the energy beam system 134.

As the build piston 152 gradually lowers and sequential layers of powdered material 120 are applied across the build plane 130, the next sequential layer of powder material 120 defines the surface of the powder bed 138 coinciding with the build plane 130. Sequential layers of the powder bed 138 may be selectively melted or fused until a completed object 114 has been additively manufactured. An additive manufacturing machine may utilize an overflow module 118 to capture excess powder material 120 in an overflow chamber 154. The overflow module 118 may include an overflow piston 156 that gradually lowers to make room within the overflow chamber 154 for additional excess powder material 120.

It will be appreciated that an additive manufacturing machine may not utilize a powder module 116 and/or an overflow module 118, and that other systems may be provided for handling the powder material 120, including different powder supply systems and/or excess powder recapture systems. The subject matter of the present disclosure may be practiced with any suitable additive manufacturing machine without departing from the scope hereof.

Still referring to FIG. 1, an additive manufacturing machine 102 may include an imaging system 158 configured to monitor one or more operating parameters of an additive manufacturing machine 102, one or more parameters of an energy beam system 134, and/or one or more operating parameters of an additive manufacturing process. The imaging system may a calibration system configured to calibrate one or more operating parameters of an additive manufacturing machine 102 and/or of an additive manufacturing process. The imaging system 158 may be a melt pool monitoring system. The one or more operating parameters of the additive manufacturing process may include operating parameters associated with additively manufacturing a three-dimensional object 114. The imaging system 158 may be configured to detect an imaging beam such as an infrared beam from a laser diode and/or a reflected portion of an energy beam (e.g., a first energy beam 144a and/or a second energy beam 144b).

An energy beam system 134 and/or an imaging system 158 may include one or more detection devices. The one or more detection devices may be configured to determine one or more parameters of an energy beam system 134, such as one or more parameters associated with irradiating the sequential layers of the powder bed 138 based at least in part on an assessment beam detected by the imaging system 158. One or more parameters associated with irradiating the sequential layers of the powder bed 138 may include irradiation parameters and/or object parameters, such as melt pool monitoring parameters. The one or more parameters determined by the imaging system 158 may be utilized, for example, by the control system 104, to control one or more operations of the additive manufacturing machine 102 and/or of the additive manufacturing system 100. The one or more detection devices may be configured to obtain assessment data of the build plane 130 from a respective assessment beam. An exemplary detection device may include a camera, an image sensor, a photo diode assembly, or the like. For example, a detection device may include charge-coupled device (e.g., a CCD sensor), an active-pixel sensor (e.g., a CMOS sensor), a quanta image device (e.g., a QIS sensor), or the like. A detection device may additionally include a lens assembly configured to focus an assessment beam along a beam path to the detection device. An imaging system 158 may include one or more imaging optical elements (not shown), such as mirrors, beam splitters, lenses, and the like, configured to direct an assessment beam to a corresponding detection device.

In addition or in the alternative to determining parameters associated with irradiation the sequential layers of the powder bed 138, the imaging system 158 may be configured to perform one or more calibration operations associated with an additive manufacturing machine 102, such as a calibration operation associated with the energy beam system 134, one or more irradiation devices 142 or components thereof, and/or the imaging system 158 or components thereof. The imaging system 158 may be configured to project an assessment beam and to detect a portion of the assessment beam reflected from the build plane 130. The assessment beam may be projected by an irradiation device 142 and/or a separate beam source associated with the imaging system 158. Additionally, and/or in the alternative, the imaging system 158 may be configured to detect an assessment beam that includes radiation emitted from the build plane 130, such as radiation from an energy beam 144 reflected from the powder bed 138 and/or radiation emitted from a melt pool in the powder bed 138 generated by an energy beam 144 and/or radiation emitted from a portion of the powder bed 138 adjacent to the melt pool. The imaging system 158 may include componentry integrated as part of the additive manufacturing machine 102 and/or componentry that is provided separately from the additive manufacturing machine 102. For example, the imaging system 158 may include componentry integrated as part of the energy beam system 134. Additionally, or in the alternative, the imaging system 158 may include separate componentry, such as in the form of an assembly, that can be installed as part of the energy beam system 134 and/or as part of the additive manufacturing machine 102.

Figure 2A:
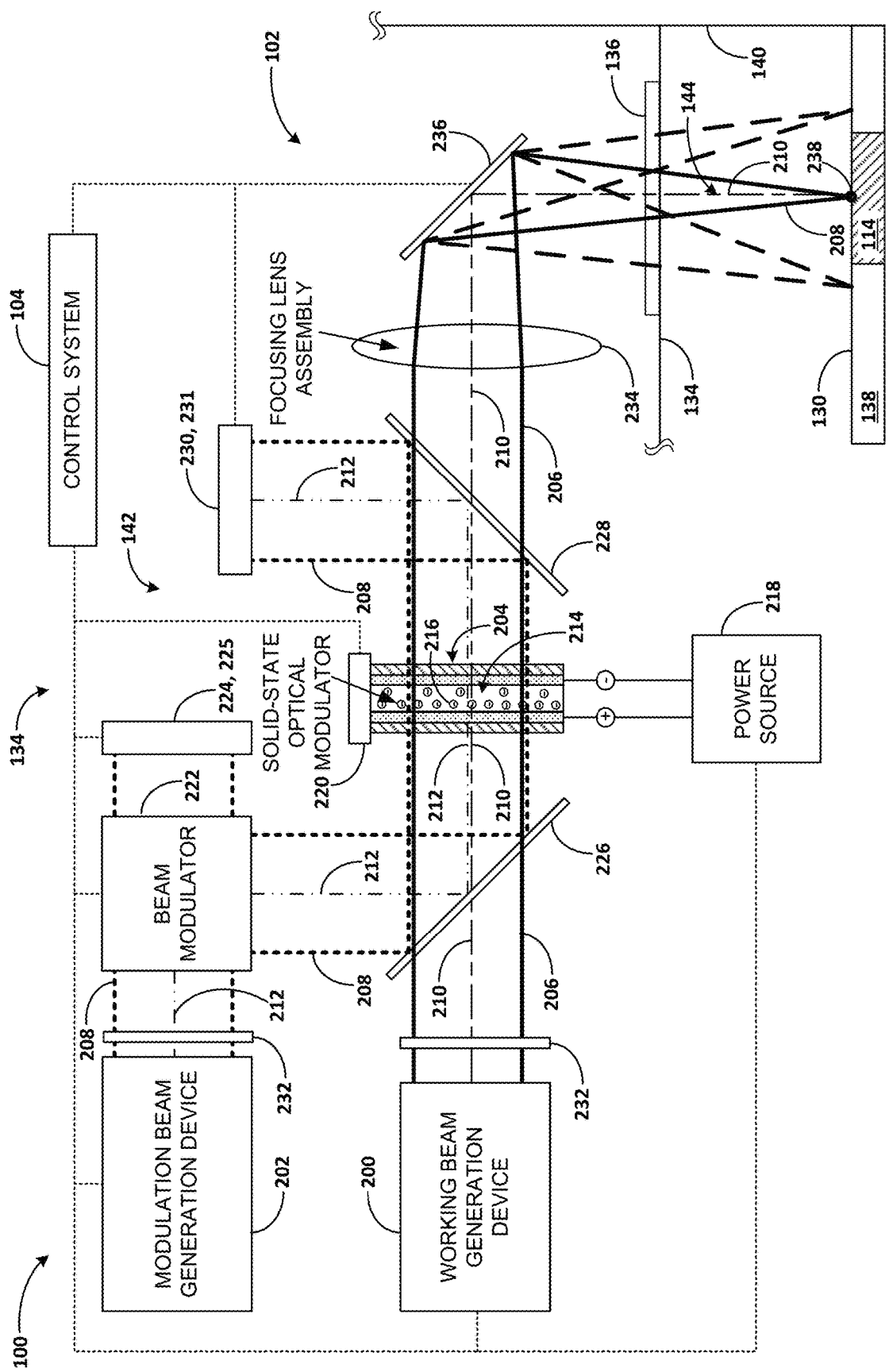
FIGS. 2A-2C schematically depict exemplary irradiation devices that may be utilized in an additive manufacturing system or machine.
Figure 2B:
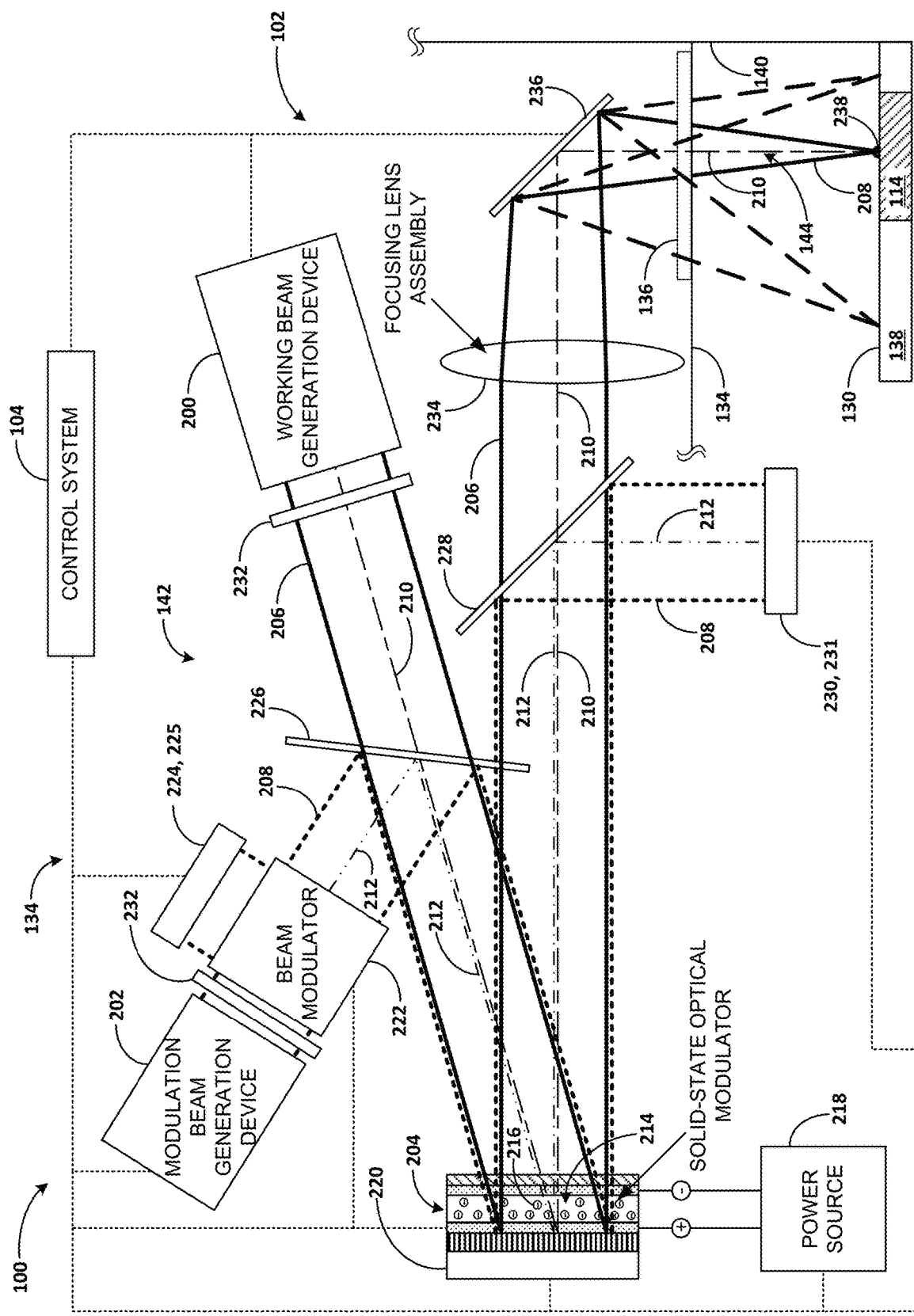
Figure 2C:
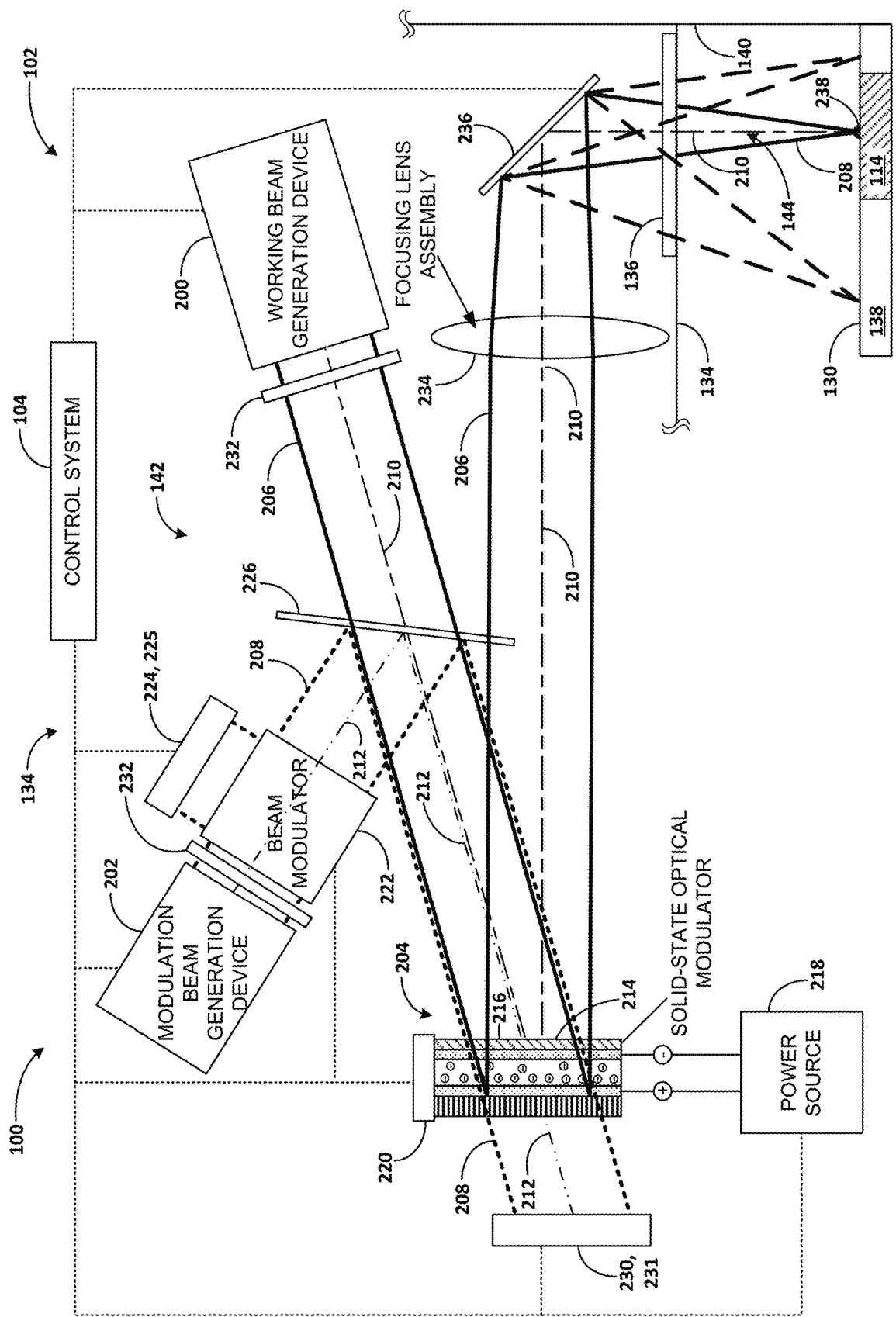

Now referring to FIGS. 2A-2C, exemplary irradiation devices 142 will be described. The irradiation devices 142 described herein may be utilized in an additive manufacturing system 100 and/or an additive manufacturing machine 102. Other uses are also contemplated. For example, exemplary irradiation device 142 may be utilized in laser welding systems, laser machining systems, laser ablation systems, laser cutting systems, laser drilling systems, laser micromanufacturing systems, and the like. As shown in FIGS. 2A-2C, an exemplary irradiation device 142 may include a working beam generation device 200, a modulation beam generation device 202, and a solid-state optical modulator 204. The working beam generation device 200 may be configured to provide a working beam 206. The modulation beam generation device 202 may be configured to provide a modulation beam 208. The working beam 206 may be configured to melt and/or sinter powder material 120. The properties of the working beam 206 may be selected based at least in part on the powder material 120 being melted or sintered by the working beam 206. By way of example, a working beam 206 suitable for melting or sintering metal powder material may exhibit a power level of from about 50 watts (W) to about 2000 W, such as from about 100 W to about 500 W, or such as from about 500 W to about 1500 W. By way of example, a working beam 206 suitable for melting or sintering powder material may exhibit a wavelength of from about 900 nanometers (nm) to about 1,100 nm, such as from about 940 nm to about 1,070 nm. The modulation beam generation device 202 may be configured to provide a modulation beam 208. The modulation beam 208 may be configured to modulate the working beam 206 at least in part by acting upon the solid-state optical modulator 204. The properties of the modulation beam 208 may be selected based at least in part to provide suitable photoexcitation within the solid-state optical modulator 204. By way of example, suitable photoexcitation may be realized by a modulation beam 208 that has a wavelength within the visible spectrum (about 400 nm to about 750 nm) and/or the long-wave ultraviolet spectrum (315 to 400 nm). For example, the modulation beam 208 may exhibit a wavelength of from about 315 nm to about 750 nm, such as from about 450 nm to about 700 nm, or such as from about 500 nm to about 560 nm. Suitable photoexcitation may be realized by a modulation beam 208 that exhibits a relatively low power level. For example, a modulation beam 208 may exhibit a power of from about 1 milliwatt (mW) to about 10 Watts (W), such as from about 1 mW to 100 mW, such as from about 5 mW to about 20 mW, such as from about 100 mW to about 500 mW, such as from about 500 mW to about 1,000 mW, such as from about 0.1 W to about 1 W, or such as from about 1 W to about 10 W. A modulation beam 208 may exhibit an intensity of from about 10 mW/cm$^2$ to about 10 W/cm$^2$, such as from about 5 mW/cm$^2$ to about 20 mW/cm$^2$, such as from about 100 mW to about 500 mW/cm$^2$, such as from about 500 mW/cm$^2$ to about 1,000 mW/cm$^2$, such as from about 0.1 W/cm$^2$ to about 1 W/cm$^2$, or such as from about 1 W/cm$^2$ to about 10 W/cm$^2$.

An irradiation device 142 may include on or more optical elements configured to operate upon the working beam 206 and/or the modulation beam 208. The optical elements may include lenses, mirrors, collimators, dichroic elements, diffractive elements, refractive elements, polarizers, phase shifters, frequency shifters, beam shaping elements, aperture elements, and so forth. The one or more optical elements may be integrated into the working beam generation device 200, the modulation beam generation device 202, and/or the solid-state optical modulator 204. Additionally, or in the alternative, the one or more optical elements may be provided as separate components. Respective optical elements may be selected to provide a suitable energy beam 144 for the particular use of the irradiation device 142.

The working beam 206 may follow a working beam path 210 that coincides with an optical axis of the working beam 206 extending from the working beam generation device 200, passing through the solid-state optical modulator 204, and extending to the build plane 130. The modulation beam 208 may follow a modulation beam path 212 that coincides with an optical axis of the modulation beam 208 extending from the modulation beam generation device 202 and passing through the solid-state optical modulator 204. The modulation beam path 212 may coincide with at least the portion of the working beam path 210 that passes through the solid-state optical modulator 204. The working beam generation device 200 and/or the modulation beam generation device 202 may be controlled by the control system 104.

The solid-state optical modulator 204 may be configured to provide an energy beam 144 that may be utilized to additively manufacture a three-dimensional object 114. The energy beam 144 may include the working beam 206. As used herein, the terms energy beam 144 and working beam 206 may be used interchangeably in appropriate contexts. In some embodiments, the energy beam 144 may additionally include the modulation beam 208. For example, the modulation beam may be brought into coincidence with the working beam 206. The modulation beam 208 may follow the modulation beam path 212 to the build plane 130. Alternatively, the modulation beam 208 may be separated from the working beam 206 downstream from the solid-state optical modulator 204.

The solid-state optical modulator 204 may include a crystalline material 214. The crystalline material 214 may exhibit a change in refractive index in response to photoexcitation of free electrons 216 within the crystalline material 214. Exemplary crystalline materials 214 may exhibit an electro-optic effect that includes a change in refractive index in response to an electric field. The crystalline material 214 may exhibit a perovskite-type structure. By way of example, the crystalline material 214 may include KTN, LN, PLZT, PMN-PT, PZN-PT, or PSN-PT, as well as combinations of these. In an exemplary embodiment, the crystalline material 214 may include KTN that exhibits a cubic phase during operation. The perovskite-type structure, such as KTN, may include polar nanoregions. The polar nanoregions may exhibit a nano-disordered arrangement in the perovskite-type crystalline material 214.

When the modulation beam 208 becomes incident upon the crystalline material, the modulation beam 208 may cause photoexcitation of the free electrons 216 within the crystalline material 214. The photoexcitation of the free electrons 216 within the crystalline material 214 may cause the crystalline material 214 to exhibit a change in refractive index. The change in refractive index may include a Kerr effect, or quadratic electro-optic effect. The working beam 206, when incident upon the crystalline material 214 may exhibit a change to one or more beam parameters of the working beam 206. The change to the one or more parameters of the working beam 206 may be attributable at least in part to the change in refractive index exhibited by the crystalline material 214. For example, the working beam may exhibit a phase shift, a polarity shift, a change in intensity, a change in intensity distribution, or a change in amplitude, as well as a combination of these. In some embodiments, the working beam 206 may exhibit a phase shift attributable at least in part to the change in refractive index exhibited by the crystalline material 214. A phase shift in any desired amount may be provided, including a phase shift of from greater than zero to less than $2\pi$, such as from about $\pi/6$ radians to about $11\pi/6$ radians, such as from about $\pi/4$ to about $7\pi/4$, such as from about $\pi/2$ to about $3\pi/2$, such as from about $2\pi/3$ to about $4\pi/3$, or such as from about $4\pi5$ to about $6\pi/5$. In some embodiments, the phase shift may include a half-wave phase shift, which refers to a phase shift of 7 radians.

Still referring to FIGS. 2A-2C, an exemplary irradiation device 142 may include a power source 218 coupled to the solid-state optical modulator 204. The power source 218 may be configured to introduce free electrons 216 into the crystalline material 214. The Kerr effect exhibited by the crystalline material 214 may be proportional to a square of the electric field introduced, for example by the power source 218. The free electrons 216 may be introduced into the crystalline material 214 by applying a voltage using the power source 218, such as a DC voltage and/or an AC voltage, for a period of time suitable to realize a desired charge density. In some embodiments, a DC current may be utilized to realize a suitable charge density prior to generating a working beam 206. Additionally, or in the alternative, an AC voltage may be applied when utilizing the working beam 206. The time required to realize a suitable charge density may depend at least in part on the voltage applied and/or the desired charge density. In addition, or in the alternative, to using a power source 218 to introduce free electrons 216 into the crystalline material 214, in some embodiments the working beam 206 and/or the modulation beam 208 may introduce free electrons 216 into the crystalline material 214. The power source 218 may be controlled by the control system 104.

The voltage applied to the crystalline material 214 may be from about 100 V to about 500 V, such as from about 250 V to about 450V. The charge density may be from about −10 coulombs per cubic meter ($C/m^3$) to about −200 $C/m^3$, such as from about −20 $C/m^3$ to about −100 $C/m^3$, or such as from about −50 $C/m^3$ to about −150 $C/m^3$. A suitable charge density may be realized in a matter of seconds, such as from about 1 second to about 60 seconds, or such as from about 5 seconds to about 30 seconds. When using an AC voltage, the voltage may exhibit a frequency of from about 5 Hz to about 250 Hz, such as from about 5 Hz to about 25 Hz, or from about 50 Hz to 150 Hz.

In some embodiments, the solid-state optical modulator may include a temperature control element 220, such as a heater and/or a cooler. Any suitable temperature control element 220 may be utilized, including a contact or non-contact heat exchanger. For example, the temperature control element 220 may include a thermoelectric heater, a thermoelectric cooler, and/or a combined thermoelectric heater/cooler. Additionally, or in the alternative, the temperature control element 220 may include an air-cooled heat exchanger, a liquid-cooled heat exchanger, and/or a liquid-heated heat exchanger. The temperature control element 220 may be controlled by the control system 104.

Additionally, or in the alternative, in some embodiments, the voltage utilized to introduce free electrons 216 into the crystalline material 214 may cause heating of the crystalline material 214. The voltage may be utilized at least in part to heat the crystalline material 214 to a temperature above the Curie temperature. Additionally, or in the alternative, the voltage may be utilized at least in part to control the temperature of the crystalline material 214, such as within a temperature range above the Curie temperature of the crystalline material 214.

Still referring to FIGS. 2A-2C, in some embodiments, the irradiation device 142 may include a beam modulator 222. The beam modulator 222 may be disposed upstream from the solid-state optical modulator 204. The beam modulator 222 may be configured to modulate the modulation beam 208 with respect to amplitude and/or phase. The beam modulator 222 may include a spatial light modulator, such as an optically-addressable spatial light modulator, or an electrically-addressable spatial light modulator. For example, the beam modulator 222 may include a digital micromirror device (DMD), a liquid crystal (LC), a liquid crystal on silicon (LCOS) device, a scanner, such as a galvo scanner or a MEMS scanner, or any other suitable micro-electro-mechanical technology. The beam modulator 222 may be calibrated and/or controlled by the control system 104. Additionally, or in the alternative, the beam modulator 222 may include a multiphoton intracules interference phase scanner (MIIPS), which may be capable of self-calibration and control. In some embodiments, the beam modulator 222 may split an unused portion of the modulation beam 208, providing an active portion of the modulation beam 208 that propagates to the solid-state optical modulator 204 and an inactive portion of the modulation beam 208 that, for example, may propagate to an upstream beam sensor 224.

At least part of the inactive portion of the modulation beam 208 may be directed to the upstream beam sensor 224. The upstream beam sensor 224 may include a detection device, such as a detection device associated with an imaging system 158. The detection device may include charge-coupled device (e.g., a CCD sensor), an active-pixel sensor (e.g., a CMOS sensor), a quanta image device (e.g., a QIS sensor), or the like. The upstream beam sensor 224 may be configured to provide data associated with the modulation beam 208, such as parameter values associated with one or more parameters of the modulation beam 208. The data associated with the modulation beam 208 may be utilized by a control system 104, such as for process monitoring and control of the modulation beam 208. For example, the data associated with the one or more parameters of the modulating beam 208 may be utilized as feedback for controlling the modulation beam generation device 202 and/or the beam modulator 222. Additionally, or in the alternative, at least part of the inactive portion of the modulation beam 208 may be directed to an upstream beam dump 225 configured to absorb energy from the unused portion of the modulation beam 208, and/or to recycle the unused portion of the modulation beam 208.

An irradiation device 142 may include one or more optical elements configured to combine the modulation beam 208 with the working beam 206, to split the working beam 206 from the modulation beam 208, and/or to split a portion of the working beam 206 and/or a portion of the modulation beam 208. As shown in FIGS. 2A-2C, the irradiation device 142 may include a beam combiner 226 situated upstream from the solid-state optical modulator 204. The beam combiner 226 may include a dichroic element, such as a dichroic mirror or a dichroic filter, configured to combine the modulation beam 208 with the working beam 206. For example, the beam combiner 226 may include a dielectric mirror, such as a Bragg mirror. The beam combiner 226 may at least partially align the modulation beam 208 (and/or the modulation beam path 212) with the working beam 206 (and/or the working beam path 210). In some embodiments, the irradiation device 142 may include a beam splitter 228 situated downstream from the crystalline material 214 of the solid-state optical modulator 204 and configured to at least partially split the modulation beam 208 (and/or the modulation beam path 212) from the working beam 206 (and/or the working beam path 210), such as after having propagated through the crystalline material 214 of the solid-state optical modulator 204. The beam splitter 228 may include a dichroic element or a dichroic filter. For example, the beam splitter 228 may include a dielectric mirror, such as a Bragg mirror, or the like. Alternatively, the modulation beam 208 may propagate to the build plane 130. In some embodiments, a downstream beam sensor 230 may be configured to receive at least part of the modulation beam 208, such as after having been split from the working beam 206 by the beam splitter 228. The downstream beam sensor 230 may include a detection device, such as a detection device associated with an imaging system 158. The detection device may include charge-coupled device (e.g., a CCD sensor), an active-pixel sensor (e.g., a CMOS sensor), a quanta image device (e.g., a QIS sensor), or the like. The downstream beam sensor 224 may be configured to provide data associated with the modulation beam 208, such as parameter values associated with one or more parameters of the modulation beam 208. The data associated with the modulation beam 208 may be utilized by a control system 104, such as for process monitoring and control of the modulation beam 208. For example, the data associated with the one or more parameters of the modulating beam 208 may be utilized as feedback for controlling the modulation beam generation device 202 and/or the beam modulator 222. Additionally, or in the alternative, at least part of the modulation beam 208 may be directed to a downstream beam dump 231 configured to absorb energy from the modulation beam 208, and/or to recycle the modulation beam 208, after having been utilized by the solid-state optical modulator 204 to modulate the working beam 206. In some embodiments, an upstream beam dump 225 and/or a downstream beam dump 231 may be configured to combine an unused portion of the modulation beam 208 with a used portion of the modulation beam 208, such as to recycle and/or absorb the energy therefrom.

Still referring to FIGS. 2A-2C, in some embodiments, an irradiation device may include a beam conditioning assembly 232 that includes one or more optical elements configured to focus and/or otherwise condition the working beam 206 and/or the modulation beam 208. A first beam conditioning assembly 232 may include one or more optical elements configured to focus and/or otherwise condition the working beam 206. A second beam conditioning assembly 232 may include one or more optical elements configured to focus and/or otherwise condition the modulation beam 208. A beam conditioning assembly 232 may include a collimator and/or a polarizer. In some embodiments, a first beam conditioning assembly 232 may include a polarizer configured to polarize the working beam 206. Polarization of the working beam 206 may be desirable to accommodate birefringence properties of the crystalline material 214 of a solid-state optical modulator 204. Birefringence refers to an optical property of a material that causes the material to exhibit a refractive index that depends on the polarization and propagation direction of light. In some embodiments, a second beam conditioning assembly 232 may include a polarizer configured to polarize the modulation beam 208.

Polarization of the modulation beam 208 may also be desirable to accommodate birefringence properties of the crystalline material 214 of a solid-state optical modulator 204. For example, an unpolarized modulation beam 208 may lead to double refraction of the modulation beam 208, which may impact the nature of photoexcitation of the crystalline material 214. For example, the regions of the crystalline material 214 within which photoexcitation occurs, and/or the extent to which photoexcitation occurs, may depend on the polarization state of the modulation beam 208. However, in some embodiments, polarization of the modulation beam 208 may be unnecessary, for example, when the birefringent properties of the crystalline material 214 with respect to the modulation beam 208 do not appreciably impact photoexcitation. In some embodiments, however, a polarized modulation beam 208 may be desirable when a beam modulator 222 exhibits birefringence, such as with a beam modulator 222 configured as an LC device or an LCOS device.

Additionally, or in the alternative, a beam conditioning assembly 323 may include a waveplate, such as a half-wave plate or a quarter-wave plate. In some embodiments, a waveplate may be configured to shift a polarization vector of the modulation beam 208, for example, when the modulation beam 208 is already polarized. The waveplate may shift the polarization vector of the modulation beam 208 to correspond with the birefringence properties of the crystalline material 214. Additionally, or in the alternative, a waveplate may be utilized in combination with a polarizer, for example, to shift and/or rotate a polarization vector of the modulation beam 208.

A polarizer may be configured to polarize a working beam 206 and/or a modulation beam 208, as applicable, such that a polarity plane is parallel with an optic axis of the crystalline material 214, which may sometimes be referred to as p-polarization. Alternatively, a polarizer may be configured to provide a polarity plane that is perpendicular with an optic axis of the crystalline material 214, which may sometimes be referred to as s-polarization. In some embodiments, a first beam conditioning assembly 232 include a first polarizer configured to polarize the working beam 206 and/or a second beam conditioning assembly 232 may include a second polarizer configured to polarize the modulation beam 208, respectively, with a polarization state such that the polarity of the working beam 206 and/or the modulation beam 208 differ from one another, such as by $\pi/2$ or by a factor of $\pi/2$. For example, the working beam 206 may exhibit p-polarization and the modulation beam 208 may exhibit s-polarization. Such alternate polarization states may mitigate the possibility for photorefractive wave coupling. In some embodiments, a waveplate may be utilized to shift a polarization vector of the modulation beam 208, for example, such that the polarization state of the modulation beam 208 differs from the polarization state of the working beam 206.

Additionally, or in the alternative, a waveplate, such as a half-wave plate or a quarter-wave plate, may be configured to shift a polarization vector of the working beam 206, for example, when the working beam 206 is already polarized. The waveplate may shift the polarization vector of the working beam 206 to correspond with the birefringence properties of the crystalline material 214, and/or such that the polarization state of the working beam 206 differs from the polarization state of the modulation beam 208. Additionally, or in the alternative, a waveplate may be utilized in combination with a polarizer, for example, to shift and/or rotate a polarization vector of the working beam 206.

Additionally, or in the alternative, an irradiation device 142 may include a focusing lens assembly 234 that includes one or more lenses configured to focus and/or otherwise condition the working beam 206 after having been modulated by the solid-state optical modulator 204. The focusing lens assembly 234 may include as a flat-field lens assembly, such as a telecentric lens assembly. The flat-field lens assembly may be configured as a Fourier lens assembly, an f-theta lens assembly, an f-tan-theta lens assembly, or the like. In some embodiments, the working beam 206 may propagate from the focusing lens assembly 234 directly to the build plane 130 to irradiate powder material 120 and thereby form an additively manufactured three-dimensional object 114. Additionally, or in the alternative, one or more mirrors may be disposed along the working beam path 210 between the focusing lens assembly 234 and the build plane 130. For example, the irradiation device 142 may include a scanner 236, such as a galvo-scanner or the like, configured to direct the working beam along the build plane 130 to irradiate specified locations of the powder bed 138. The working beam 206 may become incident upon powder material 120 defining the powder bed 138 at a zone of incidence 238, which may be sometimes referred to as a beam spot, or the like. The focusing lens assembly 234 may be configured to focus the working beam 206 such that a focal point of the working beam 206 generally coincides with the zone of incidence 238. For example, the scanner 236 may cause the working beam 206 to follow a scan path that propagates the zone of incidence 238 across the build plane 130 to irradiate specified portions of the powder bed 138, thereby forming an additively manufactured three-dimensional object 114.

As shown in FIG. 2A, the solid-state optical modulator 204 may be configured to transmit the working beam 206 and the modulator beam 208. A solid-state optical modulator 204 that is configured to transmit the working beam 206 may sometimes be referred to as a transmissive solid-state optical modulator 204. As shown in FIG. 2B, the solid-state optical modulator 204 may be configured to reflect the working beam 206 and the modulator beam 208. A solid-state optical modulator 204 that is configured to reflect the working beam 206 and the modulation beam 208 may sometimes be referred to as a reflective solid-state optical modulator 204. As shown in FIG. 2C, the solid-state optical modulator 204 may be configured to reflect the working beam 206 and to transmit the modulator beam 208. A solid-state optical modulator 204 that is configured to reflect the working beam 206 and to transmit the modulator beam 208 may sometimes be referred to as a reflective-transmissive solid-state optical modulator 204.

Figure 3B:
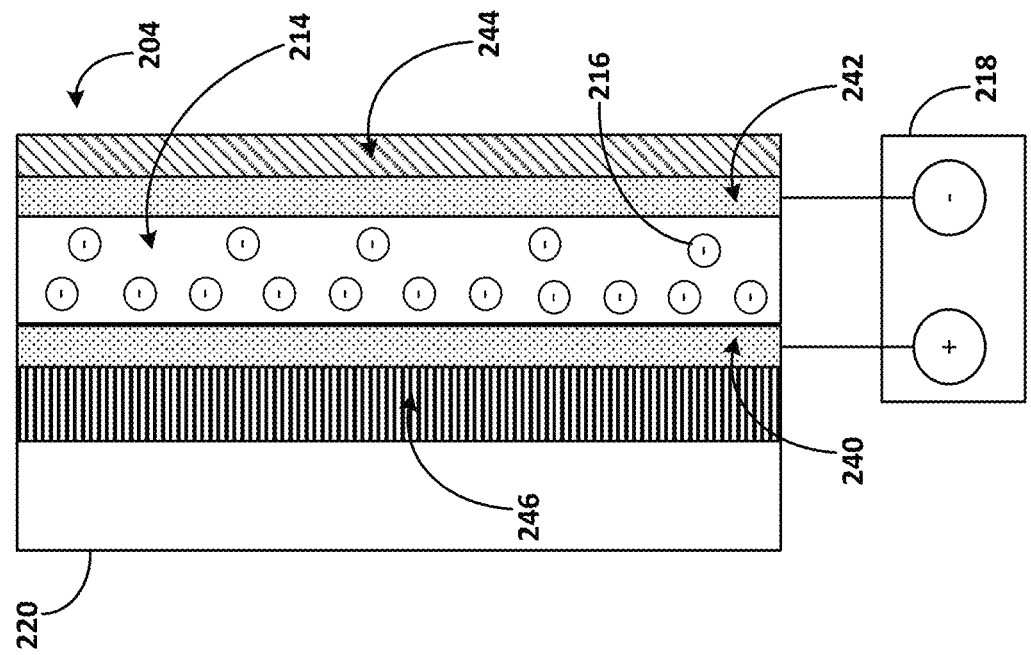
FIGS. 3A and 3B schematically depict exemplary solid-state optical modulators that may be included in an irradiation device.
Figure 3A:
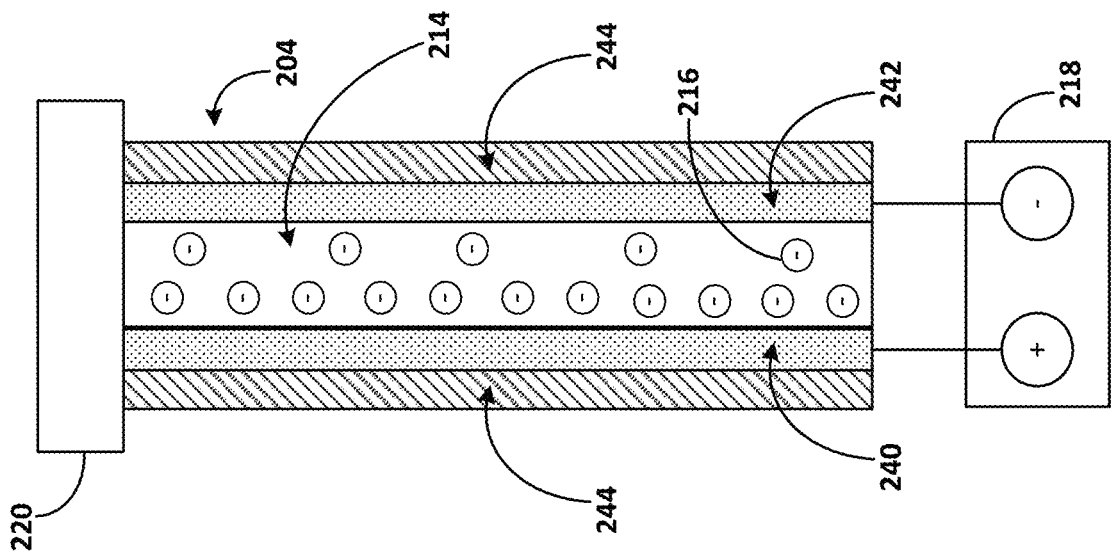

Exemplary solid-state optical modulators 204 are described in further detail with reference to FIGS. 3A-3D. FIG. 3A shows an exemplary transmissive solid-state optical modulator 204. FIG. 3B shows an exemplary reflective or reflective-transmissive solid-state optical modulator 204. As shown in FIGS. 3A and 3B, a solid-state optical modulator may include a crystalline material 214 disposed between a cathode layer 240 and an anode layer 242. The cathode layer 240 and the anode layer 242 may be formed of a transparent conducting film. The transparent conducting film may be formed of organic or inorganic materials. Suitable organic materials may include carbon nanotube networks, graphene, or poly(3,4-ethylenedioxythiophene) (PEDOT), as well as combinations of these. Suitable inorganic materials may include transparent conductive oxides, such as indium tin oxide, fluorine doped tin oxide, or doped zinc oxide, as well as combinations of these. Additionally, or in the alternative, a transparent conducting film may include a nanowire mesh, which may be formed of suitable organic or inorganic materials. The cathode layer 240 and the anode layer 242 may be electrically coupled to the power source 218.

In some embodiments, the solid-state optical modulators 204 may include an anti-reflective medium 244. The anti-reflective coating may function over a spectral band that coincides with the wavelength of the working beam 206 and/or the modulation beam 208. As used herein, the term "anti-reflective" refers to inhibition of reflection by an anti-reflective medium 244 such that less than about 20% of the energy beam is reflected at a specified wavelength range for which the an anti-reflective medium 244 is configured to inhibit reflection, such as reflection of less than about 10%, such as less than about 5%, such as less than about 1%, such as from about 10% to about 0.1%, or such as reflection of from about 5% to about 0.1% of the energy beam at the specified wavelength.

The anti-reflective medium 244 may include a coating and/or a textured surface. The anti-reflective medium 244 may be formed of a single layer or of a plurality of layers. The anti-reflective medium 244 may include a single-layer anti-reflective coating. A single-layer anti-reflective coating may exhibit an index of refraction that corresponds to the wavelength of the working beam 206. Additionally, or in the alternative, a single-layer anti-reflective coating may exhibit a quarter-wave optical thickness (QWOT) configuration that corresponds to the wavelength of the working beam 206.

The anti-reflective medium 244 may be configured as a multi-layer anti-reflective coating, such as a two-layer anti-reflective coating, or a three-layer anti-reflective coating. A multi-layer anti-reflective coating may be configured as a broadband anti-reflective coating. For example, a multi-layer anti-reflective coating may exhibit a quarter-half-quarter (QHQ) configuration that corresponds to the wavelength of the working beam 206 and/or the wavelength of the modulation beam 208. A multi-layer anti-reflective coating may include a first layer that has an index of refraction that corresponds to the working beam 206 and a second layer that has an index of refraction that corresponds to the modulation beam 208.

In addition, or in the alternative to a coating, an anti-reflective medium 244 may include a texture surface, such as a lithographically textured surface. The textured surface include nanostructures with any suitable configuration, such as pyramid structures, pillar structures, or a gaussian structures, conical structures, parabolic structures, and so forth. Additionally, or in the alternative, the anti-reflective medium 244 may include an anti-reflective grating. Additionally, or in the alternative, the anti-reflective medium 244 may include a biomimetic nanostructure, such as a "moth's eye" nanostructure. In some embodiments, an anti-reflective medium 244 may include a lithographically textured surface may be coated with an anti-reflective coating.

Suitable materials for use in a coating for an anti-reflective medium 244 include magnesium fluoride ($MgF_2$), titanium oxide ($TiO_x$), silicon oxide ($SiO_x$), hafnium oxide ($HfO_x$), silicon nitride ($Si_3N_4$), cerium oxide ($CeO_x$), zinc oxide (ZnO), zinc sulfide (ZnS), gallium nitride (GaN), or germanium (Ge), as well as combinations of these. An anti-reflective medium 244 may include a homogenous anti-reflective coating, an inhomogeneous anti-reflective coating.

In some embodiments, a solid-state optical modulator 204 may include a reflective medium 246, such as in the case of a reflective solid-state optical modulator 204 as shown in FIG. 3B. The reflective medium 246 may include a highly reflective coating. As used herein, the term "highly reflective" refers to reflection by a reflective medium 246 of at least about 80% of the energy beam at a specified wavelength range for which the reflective medium 246 is configured to reflect, such as at least about 90%, such as at least about 95%, such as at least about 99%, such as from about 90% to about 99.9%, or such as from about 95% to about 99.9% of the energy beam at the specified wavelength. The highly reflective coating may include a metal coating, such a metal coating that includes gold, silver, or aluminum, as well as combinations of these. The highly reflective coating may additionally or alternatively include a protected metal coating, such as protected gold, protective silver, or protected aluminum, as well as combinations of these. Additionally, or in the alternative, the reflective medium 246 may include a dielectric highly reflective coating configured to reflect the working beam 206 and/or the modulation beam 208 based on constructive interference. The reflective medium 246 may include a repeating stack of high-index and low-index layers, each of about one quarter-wavelength thickness. The low-index layer may be formed of a silicon oxide (e.g., $SiO_2$). The high-index layer may include oxides of titanium, tantalum, zirconium, hafnium, scandium, or niobium, as well as combinations of these. A reflective medium 246 that includes a dielectric highly reflective coating may sometimes be referred to as a dielectric mirror.

The reflective medium 246 may be selected based at least in part on the intended properties of the working beam 206 and/or of the modulation beam 208. For example, the reflective medium 246 may include a highly reflective coating and/or a dielectric mirror configured to provide high reflectivity within a particular wavelength range corresponding to the intended wavelength of the working beam 206 and/or of the modulation beam 208. By way of example, gold or protected gold may be suitable for providing high reflectance within the near infrared spectral region (e.g., 750 nanometers (nm) to 1,400 nm) and/or infrared spectral regions, such as the short-wavelength infrared spectral region (e.g., 1,400 nm to 3,000 nm). As another example, silver or protected silver may be suitable for providing high reflectance within the visible spectral region (e.g., 450 nm to 750 nm) and/or the near infrared or infrared spectral regions. A reflective medium 246 that includes a dielectric mirror may be configured for high reflectance at one or more wavelength ranges. For example, a dielectric mirror may be configured for high reflectance at a wavelength range corresponding to the working beam 206 and at a wavelength range corresponding to the modulation beam 208. By way of example, a dielectric mirror may be configured for high reflectance at a first wavelength range of from about 900 nm to about 1,100 nm, such as from about 940 nm to about 1,070 nm. Additionally, or in the alternative, a dielectric mirror may be configured for high reflectance at a second wavelength range of from about 315 nm to about 750 nm, such as from about 450 nm to about 700 nm, or such as from about 500 nm to about 560 nm.

Figure 3C:
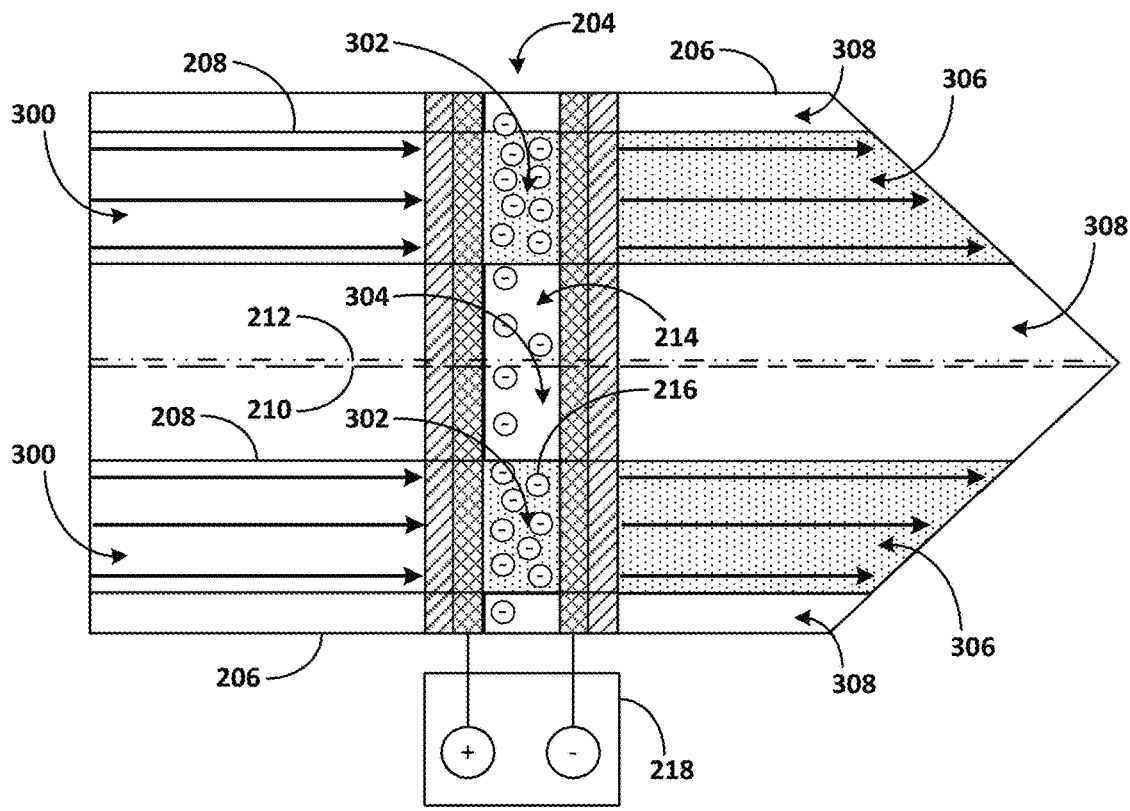
FIGS. 3C and 3D schematically depict a side cross-sectional view and a perspective cross-sectional view, respectively, of a working beam being modulated by a solid-state optical modulator.
Figure 3D:
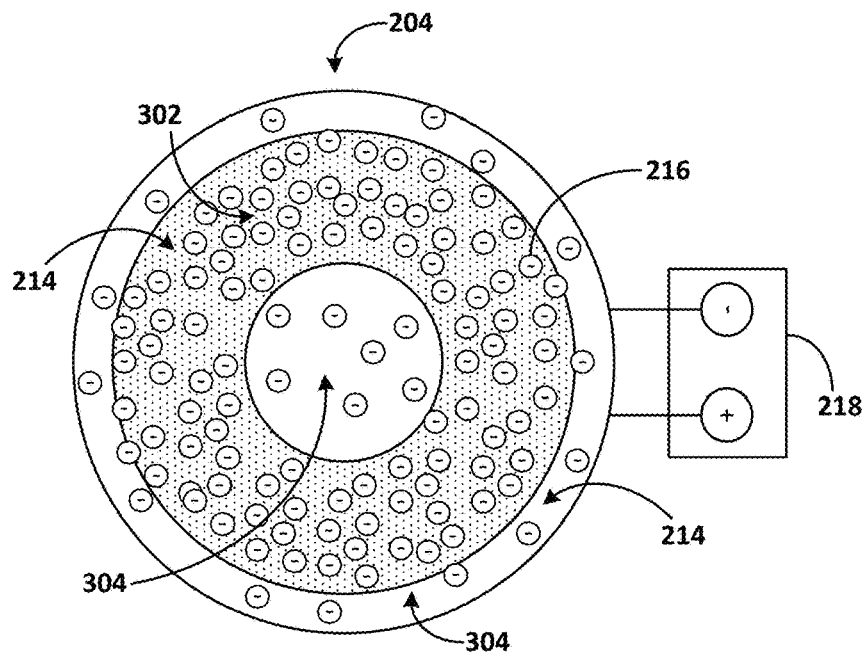

Referring now to FIGS. 3C and 3D, exemplary interactions of an active portion of the modulation beam 208 with a solid-state optical modulator 204 will be further described. A modulation beam 208 may become incident upon all or a portion of an optically addressable region of a solid-state optical modulator 204. As used herein, an optically addressable region of a solid-state optical modulator 204 refers to the portion of a crystalline material 214 of the solid-state optical modulator 204 upon which a modulation beam 208 may become incident. When the modulation beam 208 becomes incident upon the crystalline material 214, the modulation beam 208 may cause photoexcitation of free electrons 216 within the crystalline material 214. The photoexcitation of the free electrons 216 within the crystalline material 214 may cause the crystalline material 214 to exhibit a change in refractive index. The portion of the crystalline material 214 that exhibits a change in refractive index may sometimes be referred to as a modulation region 302. A portion of the crystalline material 214 that is not then-exhibiting a change in refractive index as a result of photoexcitation caused by the modulation beam 208 may sometimes be referred to as a nominal region 304 of the crystalline material 214. The particular location of a modulation region 302 and/or of a nominal region 304 may depend on the configuration of the modulation beam 208. As illustrated by the quantity of free electrons 216 depicted in FIGS. 3C and 3D, the photoexcitation of the crystalline material 214 may cause free electrons 216 to propagate and/or accumulate within the modulation region 302. The modulation region 302 may exhibit a change in refractive index attributable at least in part to the photoexcitation of the modulation region 302 by the modulation beam 208, and/or to the propagation and/or accumulation of free electrons 216 within the modulation region 302. Additionally, or in the alternative, the crystalline material 214 may exhibit a charge gradient attributable at least in part to the free electrons 216 introduced into the crystalline material 214 by the power source 218. The change in refractive index may be attributable at least in part to the charge gradient from the power source 218. In some embodiments, the charge gradient from the power source 218 and the photoexcitation by the modulation beam 208 may work in synergy to provide an enhanced change in refractive index, for example, with respect to the modulation region 302 of the crystalline material 214.

The modulation beam 208 may include an active portion 300 as a result of modulation by a beam modulator 222 described with reference to FIGS. 2A-2C. The active portion 300 of the modulation beam 208 may include amplitude modulation and/or phase modulation. The active portion 300 of the modulation beam 208 may exhibit any desired spatial configuration. By way of example, as shown in FIGS. 3C and 3D, the active portion 300 of the modulation beam 208 may exhibit an annular or "doughnut-shaped" configuration. The spatial configuration of the modulation beam 208 may be described with reference to an active region of the beam modulator 222 utilized to provide the active portion 300 of the modulation beam 208, and/or with reference to the modulation region 302 of the solid-state optical modulator 204. By way of example, an annular region of the beam modulator 222 may be activated to provide an active portion 300 of a modulation beam 208, such that the modulation beam 208 and/or the active portion 300 thereof has an annular configuration. Additionally, or in the alternative, the modulation beam 208 and/or the active portion 300 thereof may provide a modulation region 302 of the solid-state optical modulator 204 that has an annular configuration. The annular configuration shown in FIGS. 3C and 3D is provided by way of example and not to be limiting. In fact, a modulation beam 208 and/or the active portion 300 thereof may exhibit any desired configuration, and a modulation region 302 of a solid-state optical modulator 204 may exhibit any desired configuration.

As illustrated in FIGS. 3C and 3D, when the modulation beam 208 becomes incident upon a modulation region 302 of the crystalline material 214 of the solid-state optical modulator 204, the modulation beam 208 may cause photoexcitation of free electrons 216 within the modulation region. The photoexcitation of the free electrons 216 within the modulation region may cause the modulation region 302 to exhibit a change in refractive index, for example, relative to a nominal region 304 of the crystalline material. The change in refractive index of the modulation region 302 may depend at least in part on the charge density of free electrons 216. The charge density of free electrons 216 may depend at least in part on the intensity and/or power level of the modulation beam 208. For example, in some embodiments, an electromagnetic field of the modulation beam 208 may attract free electrons 216, causing free electrons to accumulate and/or propagate within the modulation region 302. In some embodiments, the refractive index of the modulation region 302 may be controlled based at least in part on the intensity of the modulation beam 208. Additionally, or in the alternative, one or more properties of the working beam 206, such as a phase shift, a polarity shift, a change in intensity, a change in intensity distribution, and/or a change in amplitude, may be controlled based at least in part on the intensity and/or power level of the modulation beam 208. The working beam 206 may become incident upon the crystalline material 214 concurrently, before, or after the modulation beam 208 becomes incident upon the crystalline material 214. The working beam 206 may propagate through the crystalline material 214 while the modulation region 302 exhibits a change in refractive index caused by the modulation beam 208. The change in refractive index of the crystalline material 214 may impart a modulation state to the working beam 206 corresponding to the modulation region 302 of the crystalline material. The modulation state of the working beam 206 maybe described with reference to a modulated portion 306 of the working beam 206 and/or a nominal portion 308 of the working beam 206. A working beam 206 that exhibits a modulated state may include a modulated portion 306 that propagates through a modulation region 302 of the crystalline material 214. Additionally, or in the alternative, a working beam 206 may include a nominal portion 308 that propagates through a nominal region 304 of the crystalline material 214. The change in refractive index exhibited by the modulation region 302 may cause the modulated portion 306 of the working beam 206 to exhibit a change to one or more beam parameters relative to the nominal portion 308 of the working beam 206. For example, the modulated portion 306 of the working beam 206 may exhibit a phase shift, a polarity shift, a change in intensity, a change in intensity distribution, or a change in amplitude, as well as a combination of these. In some embodiments, the modulated portion 306 of the working beam 206 may exhibit a phase shift, relative to the nominal portion 308 of the working beam, attributable at least in part to the change in refractive index exhibited by the crystalline material 214.

The working beam 206 may be used to irradiate a powder bed 138 formed of a powder material 120. The working beam 206 may become incident upon the powder material 120 at a zone of incidence 238. The change to one or more beam parameters imparted to the working beam 206, such as to the modulated portion 306, may augment an intensity distribution of the working beam 206 at the zone of incidence 238. For example, a phase shift imparted to the working beam 206, such as to the modulated portion 306, may augment an intensity distribution of the working beam 206 at the zone of incidence 238. Additionally, or in the alternative, the modulated portion 306 of the working beam 206 and the nominal portion 308 of the working beam 206 may exhibit superposition that augments an intensity of the working beam 206 with respect to the modulated portion 306 and the nominal portion 308 incident upon the powder material 120.

The modulation beam 208 may be modulated by the beam modulator 222 periodically and/or intermittently, for example, to provide different modulation states as desired to augment one or more properties of the working beam 206, such as to impart a modulation state that includes a phase shift, a polarity shift, a change in intensity, a change in intensity distribution, and/or a change in amplitude. A modulation state of the modulation beam 208 may be changed frequently, such as periodically and/or intermittently, during the course of irradiating powder material 120 with the working beam 206. Additionally, or in the alternative, a modulation state of the modulation beam 208 may be held constant for a specified period of time. For example, a modulation state of the modulation beam 208 may be changed according to a desired modulation state of the working beam 206 corresponding to an irradiation strategy utilized to form respective layers of a three-dimensional object 114. By way of example, different properties of the working beam 206 may be provided for different regions of respective layers of a three dimensional object 114 and/or for different portions of a three-dimensional object 114 at least in part by selecting a corresponding modulation state of the working beam 206. Such properties of the working beam 206 may be selected based at least in part on desired physical properties of the resulting three-dimensional object and/or based at least in part on operating efficiency parameters of the additive manufacturing machine 102.

In some embodiments, a modulation state of the crystalline material 214 may be normalized from time to time, for example, before and/or after imparting a modulation state to a working beam 206 and/or changing a modulation state of a working beam 206. As used herein the term "normalized," with reference to the crystalline material 214, refers to a state of the crystalline material 214 in which the crystalline material 214 exhibits a substantially uniform distribution of free electrons 216 with respect to a plane and/or an axis oriented normal to the working beam path 210 transecting the crystalline material 214 and coinciding with the optical axis of the working beam 206. Such a crystalline material 214 may be described as exhibiting a "normalized state." In some embodiments, a crystalline material 214 that exhibits a normalized state may exhibit a substantially uniform distribution of free electrons 216 along a direction parallel to the working beam path 210 transecting the crystalline material 214 and coinciding with the optical axis of the working beam 206. Alternatively, a crystalline material 214 that exhibits a normalized state may exhibit a concentration gradient in the distribution of free electrons 216 along a direction parallel to the working beam path 210 transecting the crystalline material 214 and coinciding with the optical axis of the working beam 206. A crystalline material 214 may be regarded as normalized, such that the crystalline material 214 exhibits a normalized state, when a concentration gradient of free electrons 216 exhibited by the crystalline material 214 results in a variation in refractive index across a plane and/or an axis oriented normal to the working beam path 210 that that is less than the level of precision of the solid-state optical modulator 204. For example, a variation in refractive index for a normalized crystalline material 214 may be from about 0.0001% to about 1%, such as less than 1%, such as less than 0.1%, such as less than 0.01%, or such as less than 0.001%.

A crystalline material 214 of a solid-state optical modulator 204 may be normalized, with respect to a distribution of free electrons 216, by applying a countercurrent voltage to the crystalline material 214 with the power source 218. A countercurrent voltage may be applied, for example, to normalize a distribution of free electrons 216 within the crystalline material 214 by cycling of an AC voltage from the power source 218 according to a desired cycling frequency and/or by switching a current direction of a DC voltage from the power source 218. The cycling of the AC current voltage may be cycled according to a desired cycling frequency. For example, the AC current voltage may be cycled at a frequency of from about 1 hertz (Hz) to about 1,000 megahertz (mHz), such as from about 45 Hz to about 65 Hz, such as from about 395 Hz to about 420 Hz, such as from about 500 Hz to about 1 kHz, such as from about 1 kHz to about 10 kHz, such as from about 10 kHz to about 100 kHz, such as from about 100 kHz to about 500 kHz, such as from about 500 kHz, to about 1 mHz, such as from about 1 mHz to about 10 mHz, such as from about 10 mHz to about 100 mHz, such as from about 100 mHz, to about 1,000 mHz.

Additionally, or in the alternative, a crystalline material 214 may be normalized by photoexciting free electrons 216 within the crystalline material 214 with a modulation beam 208. For example, a beam modulator 222 may provide a modulation beam 208 that becomes incident upon respective regions of the crystalline material 214 to thereby normalize the crystalline material 214. In some embodiments, a beam modulator 222 may direct a modulation beam 208 across an entire working region of the crystalline material 214, such as an entire region of the crystalline material 214 accessible by the modulation beam 208 and/or an entire region of the crystalline material 214 accessible by the working beam 206. Additionally, or in the alternative, a beam modulator 222 may direct a modulation beam 208 across a portion of the working region of the crystalline material 214, such as all or part of one or more nominal regions 304 of the crystalline material 214. The modulation beam 208 may cause the crystalline material 214 to exhibit photoexcitation with respect to a plane and/or an axis oriented normal to a working beam path 210 transecting the crystalline material 214. The photoexcitation may be exhibited substantially uniformly across the plane and/or axis oriented normal to a working beam path 210. The photoexcitation may normalize the crystalline material 214, such that the crystalline material 214 exhibits a substantially uniform distribution of free electrons 216 with respect to a plane and/or an axis oriented normal to the working beam path 210. A modulation beam 208, when utilized to normalize the crystalline material 214, may sometimes be referred to as a "normalization beam." A beam modulator 222 and/or a modulation beam generation device 202 may cycle between a modulation beam and a normalization beam according to a desired cycling frequency. For example, the beam modulator 222 and/or a modulation beam generation device 202 may be cycled at a frequency of from about 1 hertz (Hz) to about 1,000 megahertz (mHz), such as from about 45 Hz to about 65 Hz, such as from about 395 Hz to about 420 Hz, such as from about 500 Hz to about 1 kHz, such as from about 1 kHz to about 10 kHz, such as from about 10 kHz to about 100 kHz, such as from about 100 kHz to about 500 kHz, such as from about 500 kHz, to about 1 mHz, such as from about 1 mHz to about 10 mHz, such as from about 10 mHz to about 100 mHz, such as from about 100 mHz, to about 1,000 mHz.

In some embodiments, an energy beam device 142 may exhibit a modulation frequency that allows for rapid changes to the modulation state of the working beam 206. As used herein, the term "modulation frequency" refers to a cycling rate between different modulation states. One cycle of a modulation frequency includes a normalization state and a modulation state, which may sometimes be referred to as a "modulation cycle." In some embodiments, a modulation frequency may be synchronized with a pulse frequency of a working beam 206. For example, the cycling frequency of the AC current voltage may be synchronized with a pulse frequency of a working beam 206 and/or with a pulse frequency of a modulation beam 208. Additionally, or in the alternative, a pulse frequency of the normalization beam may be synchronized with a pulse frequency of a working beam 206. An energy beam device 142 may exhibit any desired modulation frequency. For example, an energy beam device 142 may exhibit a modulation frequency of from about 1 hertz (Hz) to about 1,000 megahertz (mHz), such as from about 45 Hz to about 65 Hz, such as from about 395 Hz to about 420 Hz, such as from about 500 Hz to about 1 kHz, such as from about 1 kHz to about 10 kHz, such as from about 10 kHz to about 100 kHz, such as from about 100 kHz to about 500 kHz, such as from about 500 kHz, to about 1 mHz, such as from about 1 mHz to about 10 mHz, such as from about 10 mHz to about 100 mHz, such as from about 100 mHz, to about 1,000 mHz. Additionally, or in the alternative, a working beam generation device 200 may provide a working beam 206 in the form of a continuous wave beam, while the beam modulator 222 and/or the modulation beam generation device 202 may cycle according to a modulation frequency. Additionally, or in the alternative, the modulation beam generation device 202 may provide a modulation beam 208 in the form of a continuous wave beam, while the power source 218 may cycle according to a modulation frequency.

Figure 4A:
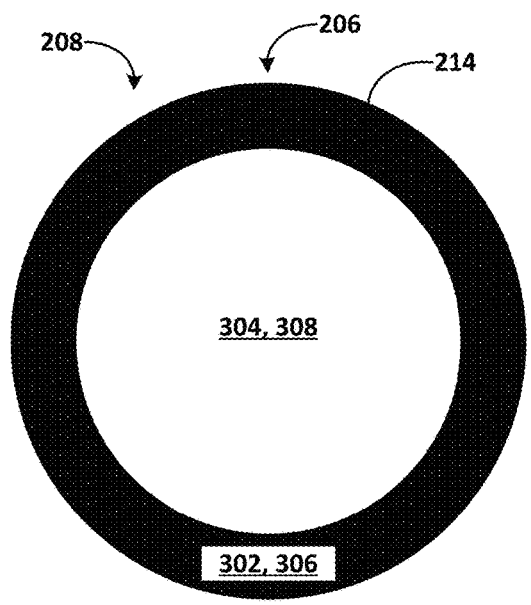
FIGS. 4A-4FF schematically depict exemplary modulation profiles that may be imparted to a working beam by a solid-state optical modulator.
Figure 4B:
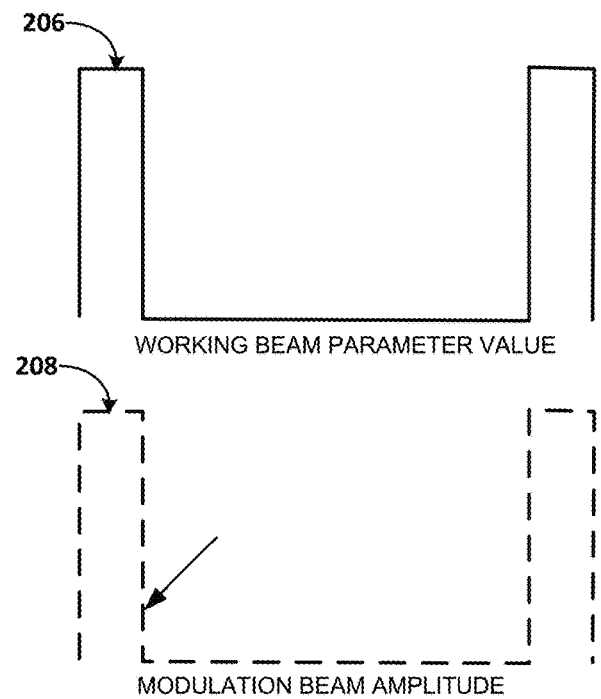
Figure 4C:
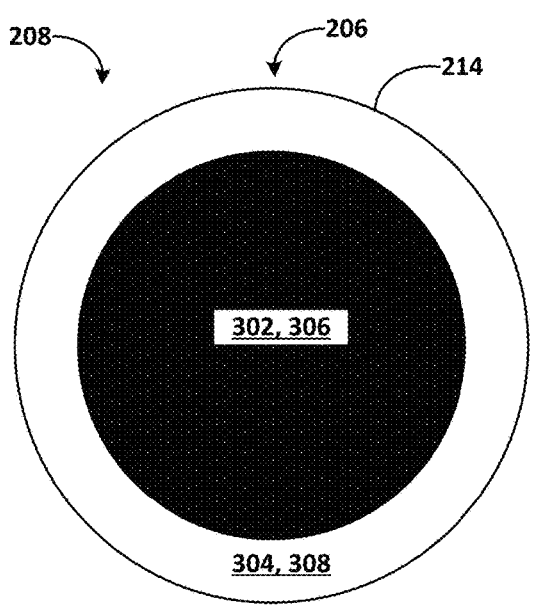
Figure 4D:
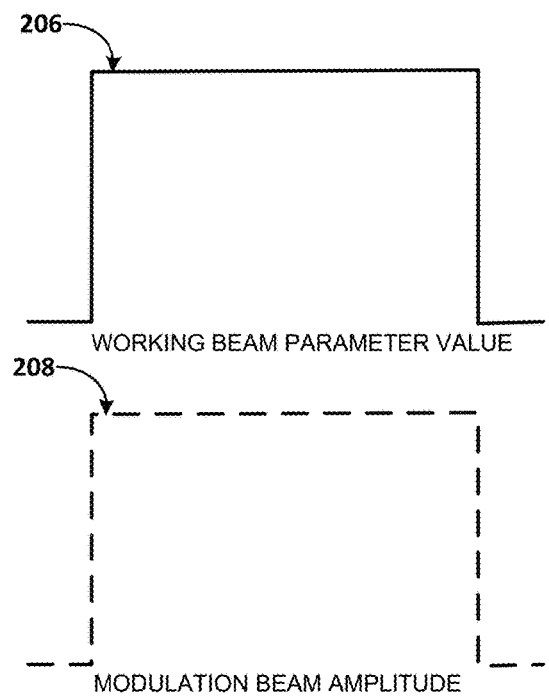
Figure 4E:
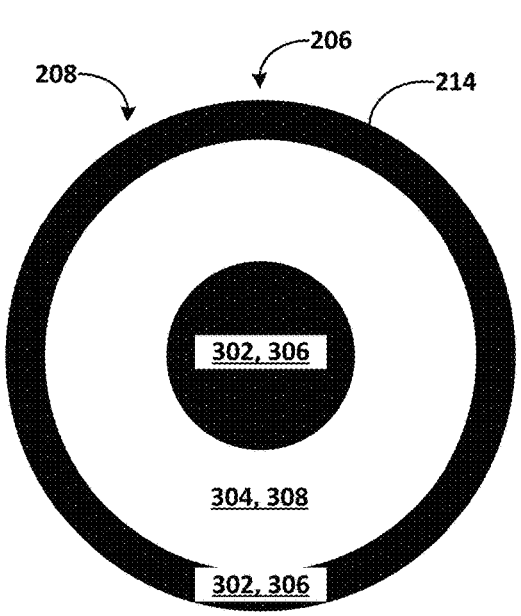
Figure 4F:
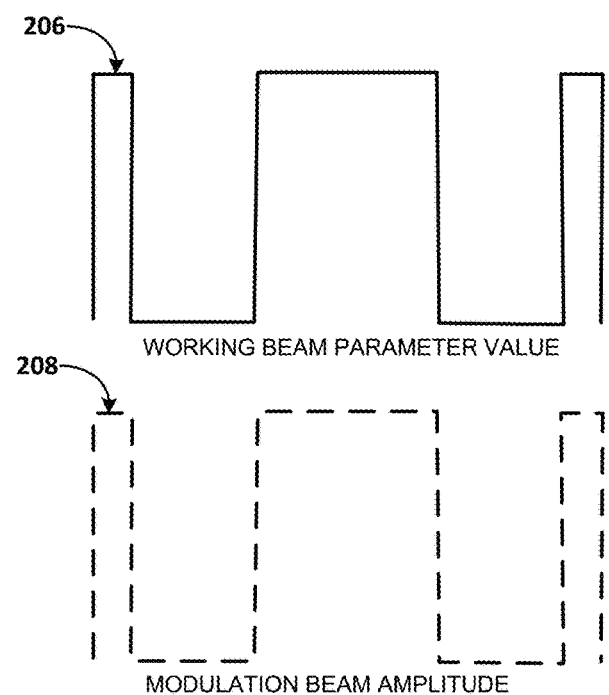
Figure 4G:
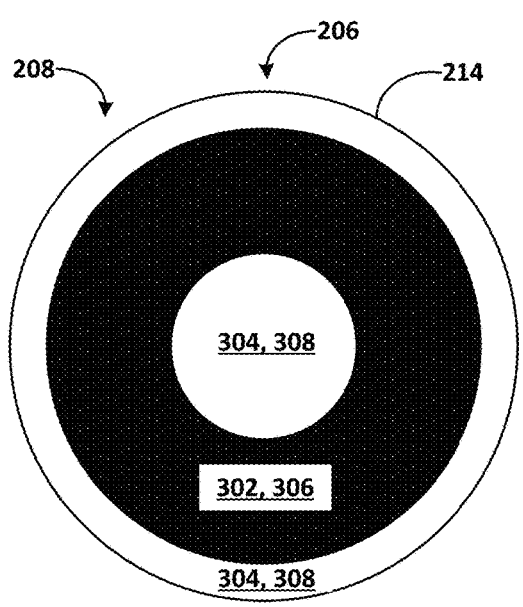
Figure 4H:
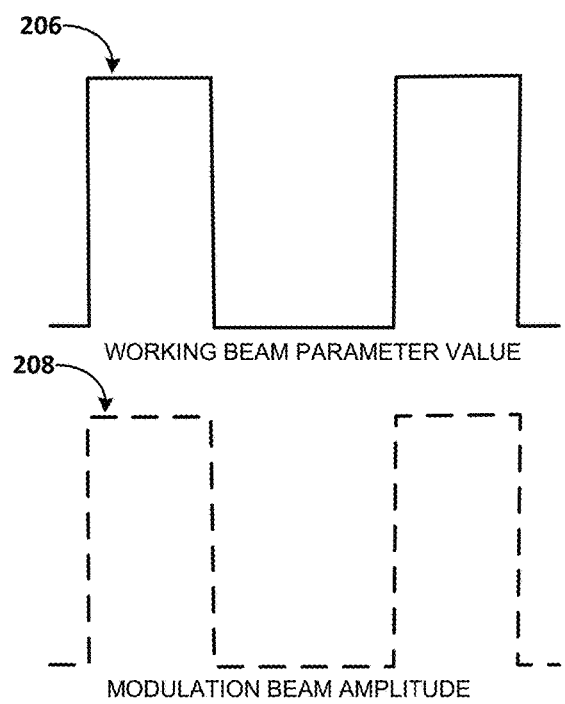
Figure 4I:
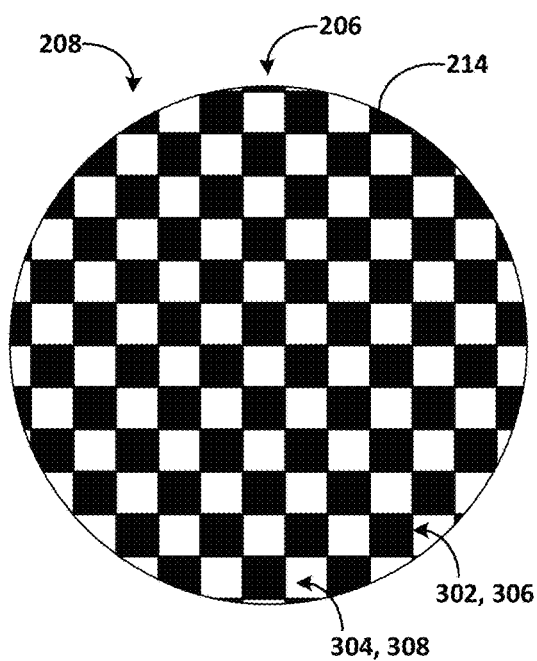
Figure 4J:
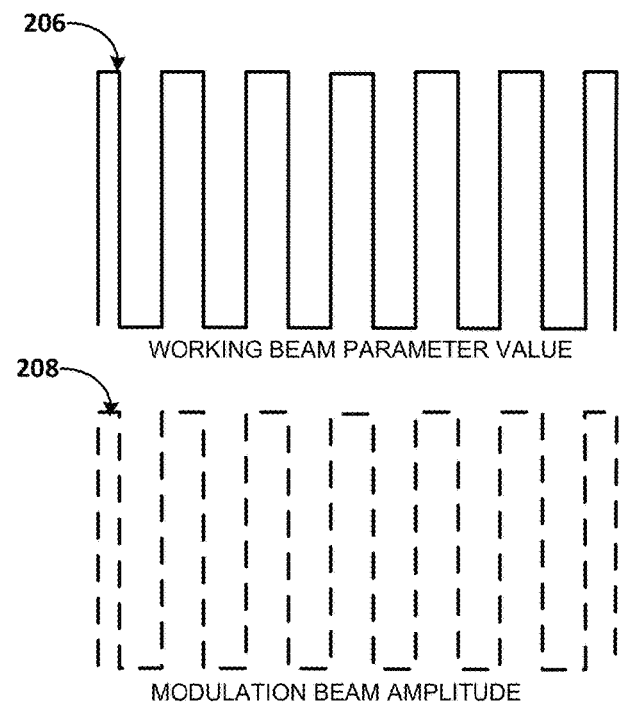
Figure 4K:
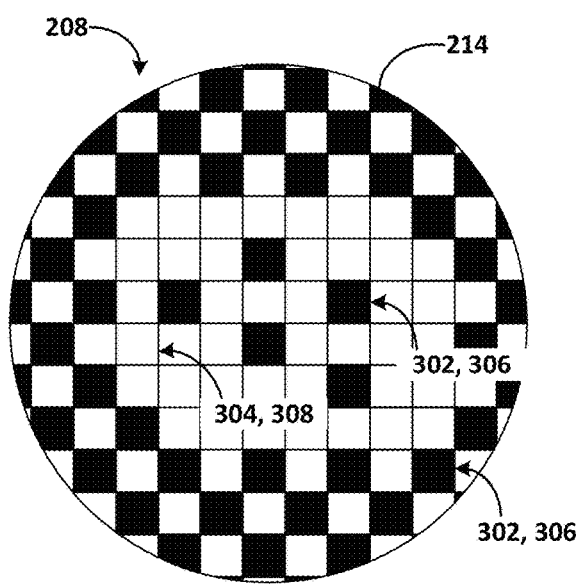
Figure 4L:
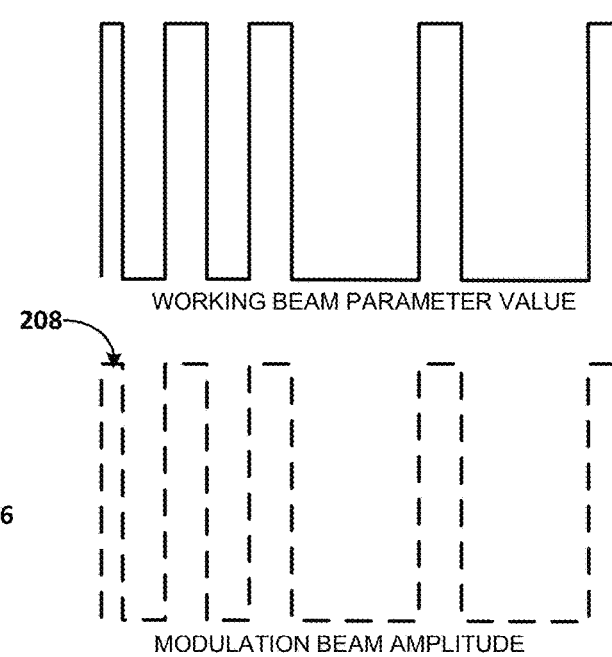
Figure 4M:
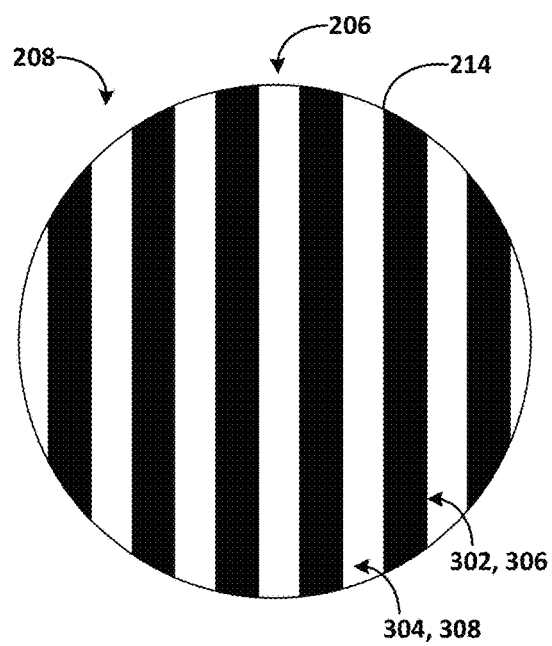
Figure 4N:
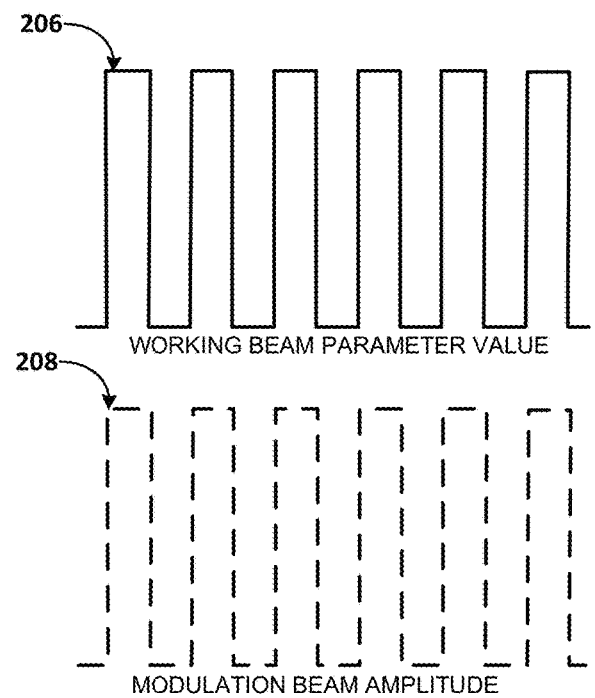
Figure 4O:
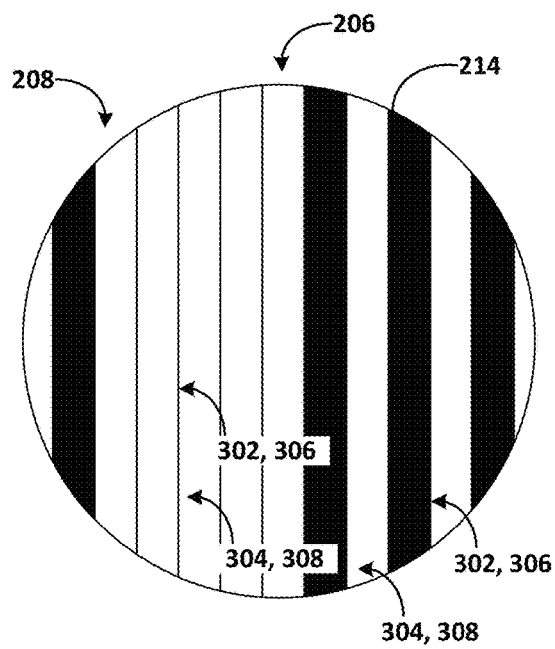
Figure 4P:
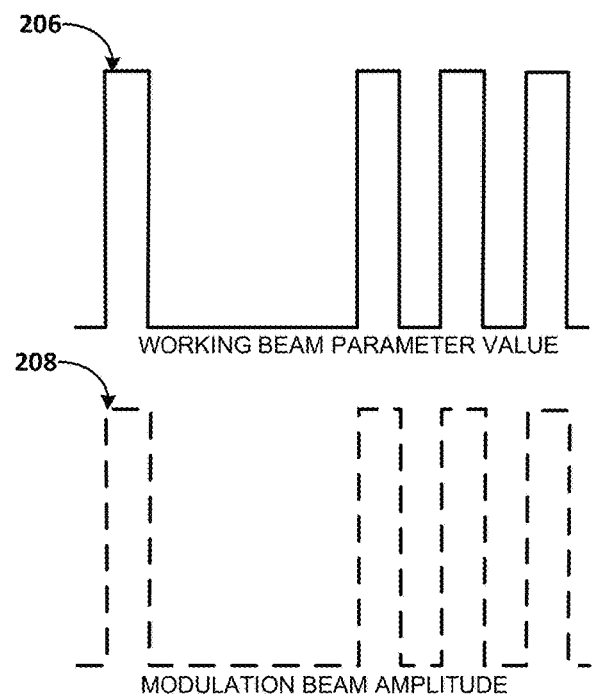
Figure 4Q:
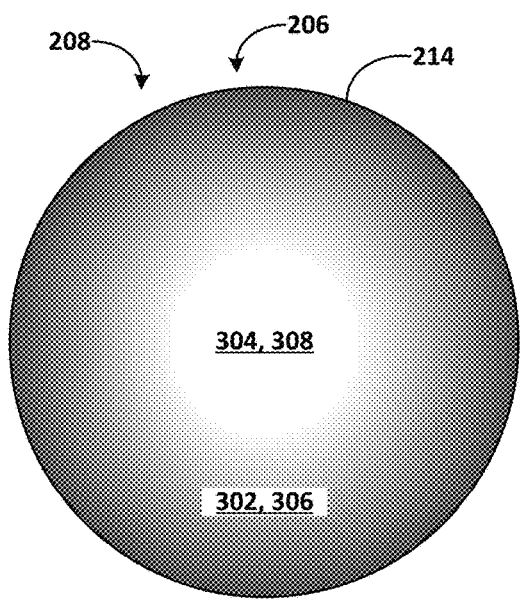
Figure 4R:
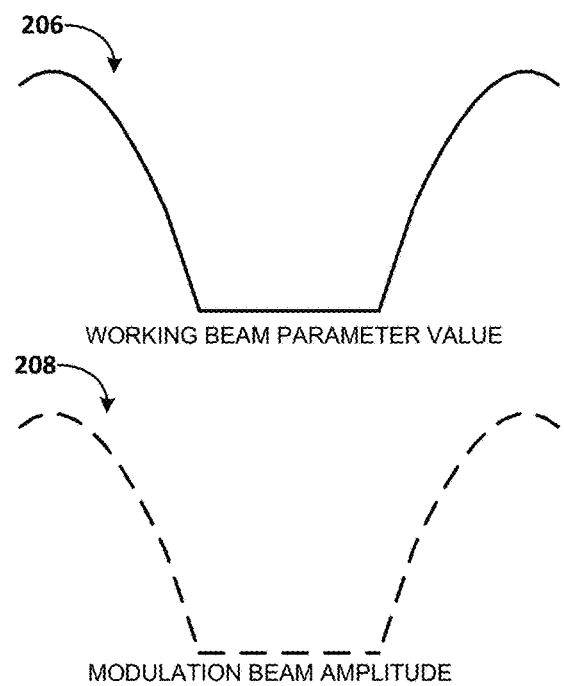
Figure 4S:
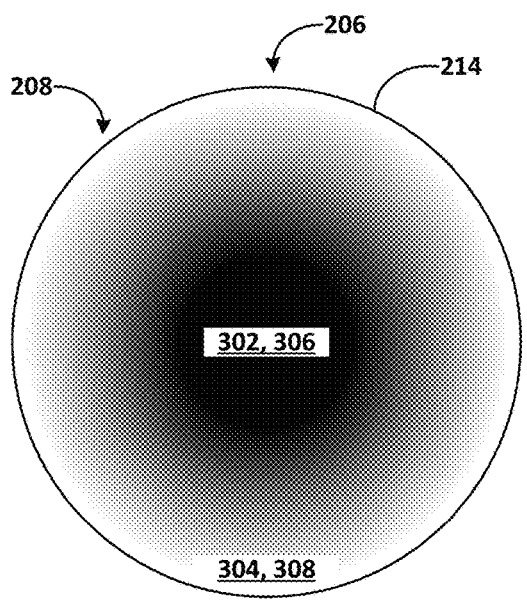
Figure 4T:
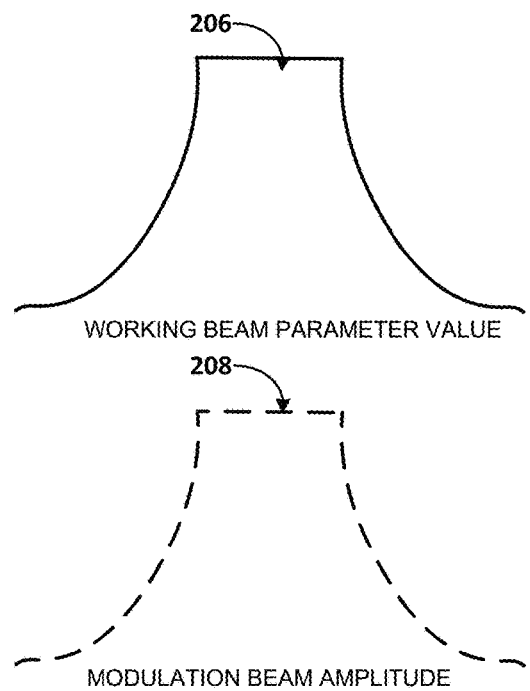
Figure 4U:
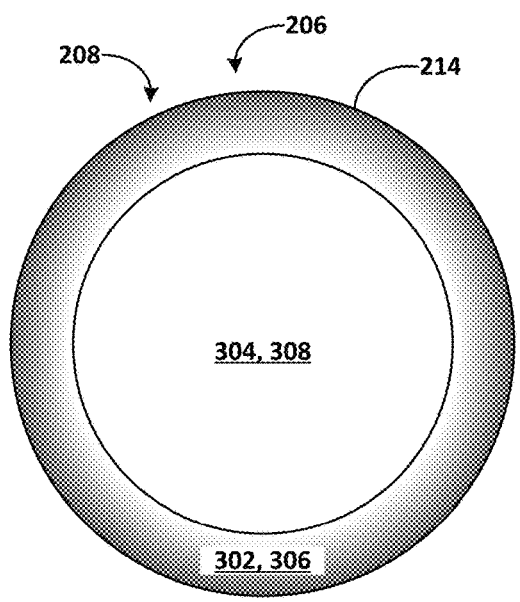
Figure 4V:
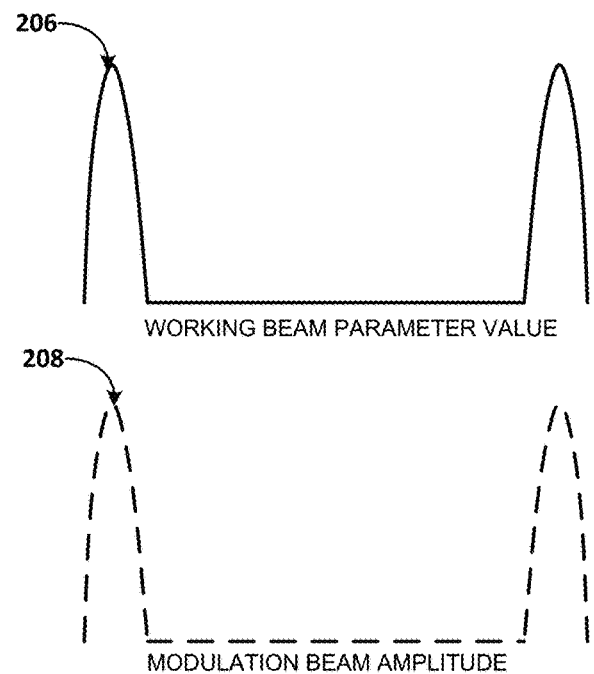
Figure 4W:
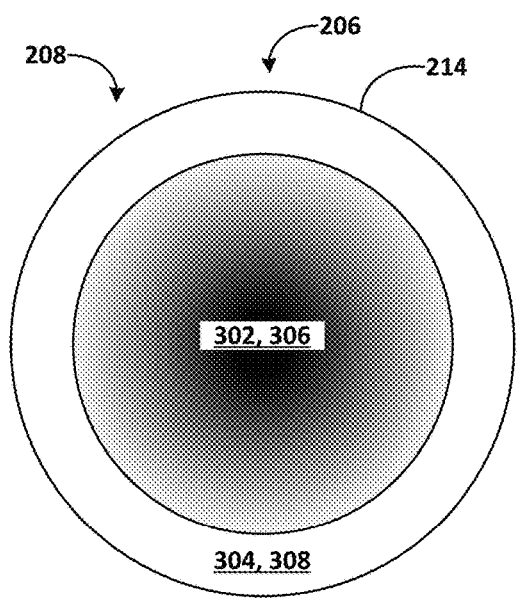
Figure 4X:
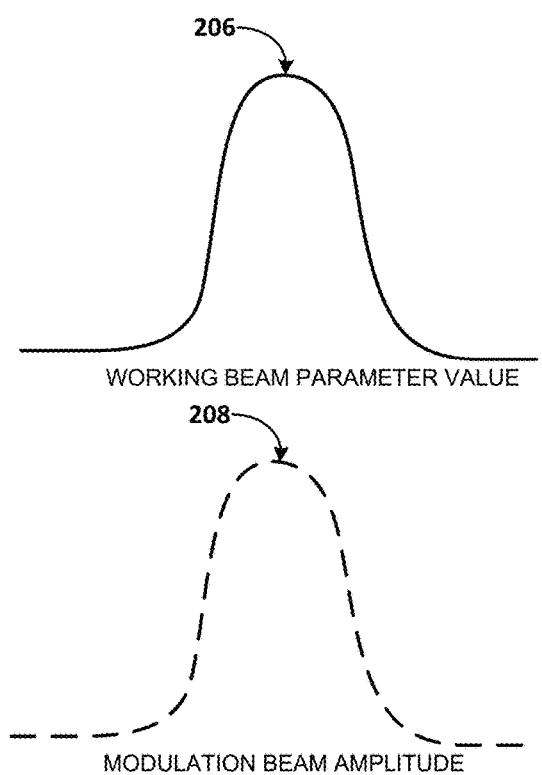
Figure 4Y:
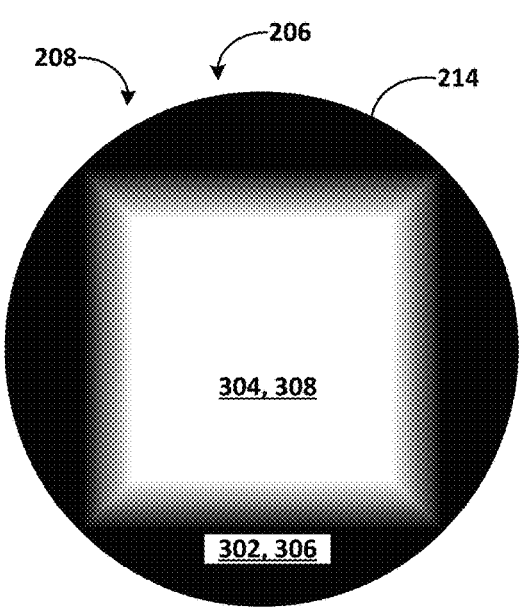
Figure 4Z:
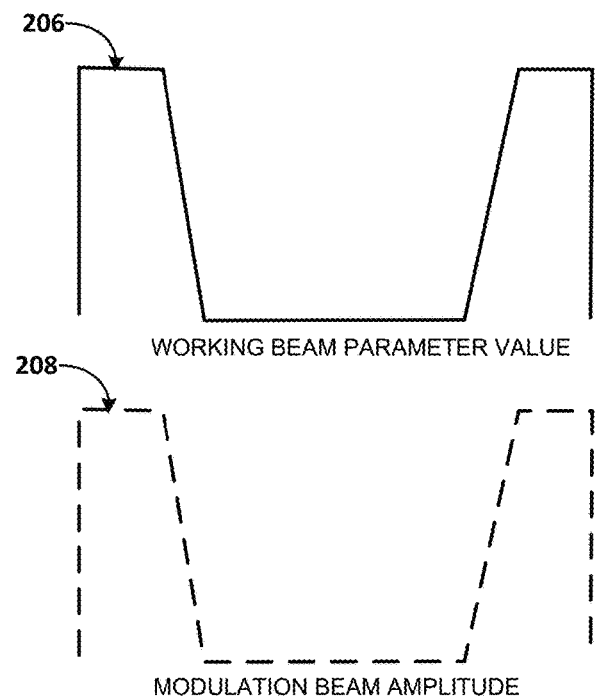
Figure 4A:
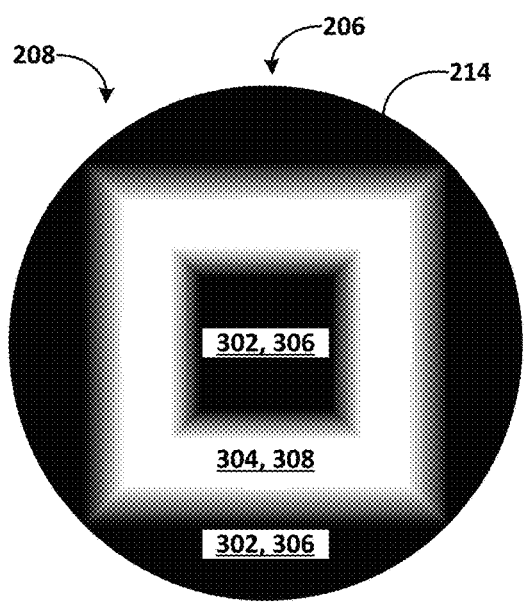
Figure 4B:
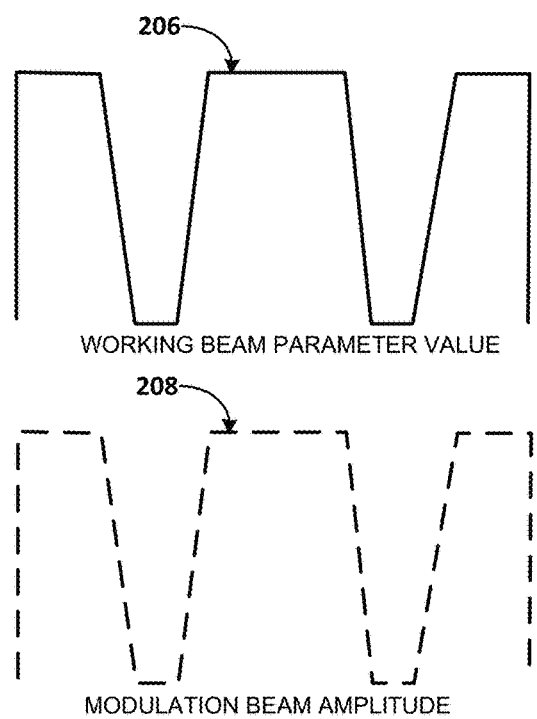
Figure 4C:
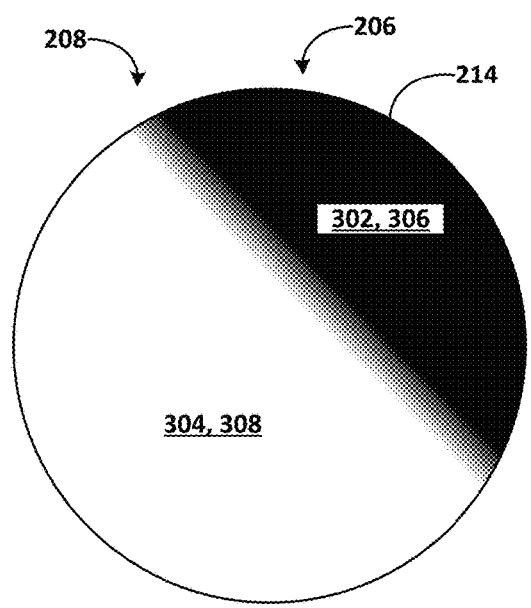
Figure 4D:
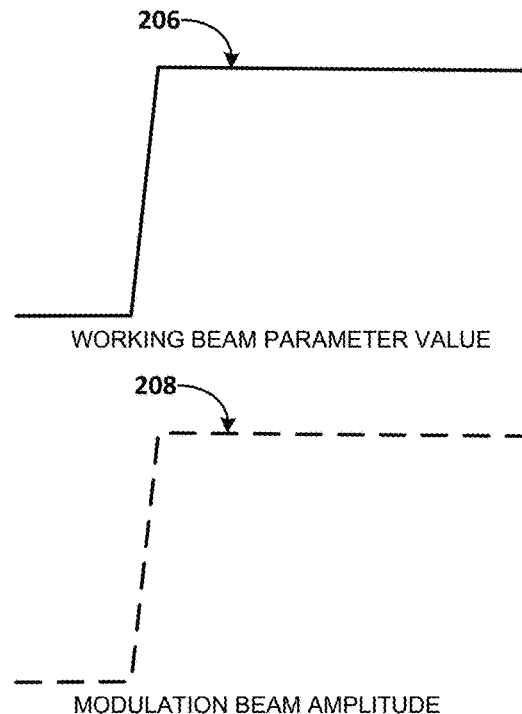
Figure 4E:
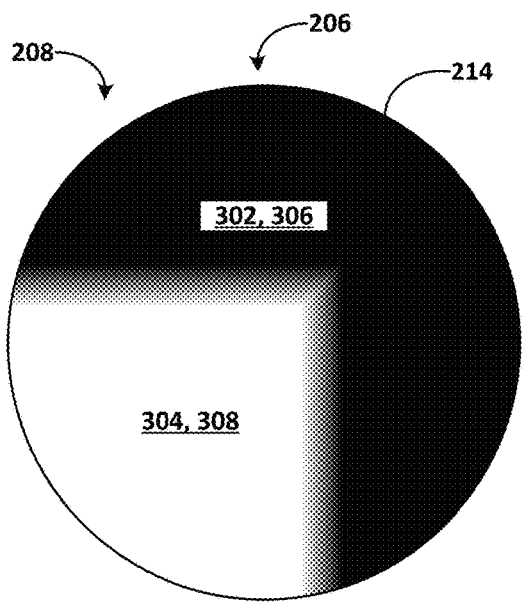
Figure 4F:
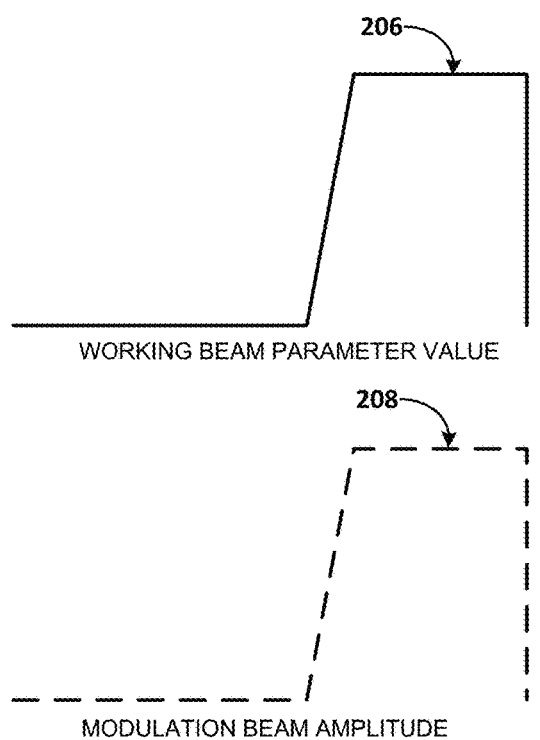

Now referring to FIGS. 4A-4H, 4I-4P, 4Q-4X, 4Y-4FF, exemplary beam profiles and corresponding modulation regions 302 of a crystalline material 214 will be further described. The beam profiles may represent a modulation beam 208 incident upon a solid-state optical modulator 204 and/or a working beam 206 that may be imparted by a solid-state optical modulator 204. As shown, a beam profile of a working beam 206 may be described with reference to a modulated portion 306 and/or with reference to a nominal portion 308. Additionally, or in the alternative, as shown, a change in refractive index exhibited by a crystalline material 214, and/or a beam profile of a working beam 206, may be described with reference to a modulation region 302 and/or a nominal region 304 of the crystalline material 214. A modulation beam 208 incident upon a crystalline material 214 may correspond to a modulation region 302 and/or a nominal region 304 of the crystalline material 214. FIGS. 4A, 4C, 4E, 4G, 4I, 4K, 4M, 4O, 4Q, 4S, 4U, 4W, 4Y, 4AA, 4CC, and 4EE may respectively depict a cross-sectional profile of a modulation region 302 and/or a nominal region 304 of a crystalline material 214. Additionally, or in the alternative, FIGS. 4A, 4C, 4E, 4G, 4I, 4K, 4M, 4O, 4Q, 4S, 4U, 4W, 4Y, 4AA, 4CC, and 4EE may respectively depict corresponding cross-sectional beam profiles of a modulation beam 208 incident upon the crystalline material 214, and/or corresponding cross-sectional beam profiles of a modulated portion 306 and/or a nominal portion 308 a working beam 206 propagating from the respective modulation region 302 and/or nominal region 304 of the crystalline material 214. FIGS. 4B, 4D, 4F, 4J, 4L, 4N, 4P, 4R, 4T, 4V, 4X, 4Z, 4BB, 4DD, and 4FF respectively depict an profile of a modulation beam 208 incident upon the crystalline material 214 and corresponding profile of a beam parameter value for a working beam 206 propagating from the crystalline material 214. The amplitude profile of the modulation beam 208 may represent an intensity profile and/or a power density distribution of the modulation beam 208. The corresponding profile of the beam parameter value for the working beam 206 may represent a phase shift or any other beam parameter augmented by the working beam propagating through the crystalline material 214, such as by the modulation region 302 of the crystalline material. The beam parameter values for the working beam 206 are shown in absolute terms; however, it will be appreciated that a beam parameter value may be increased and/or decreased. FIGS. 4A and 4B may correspond to one another. FIGS. 4C and 4D may correspond to one another. FIGS. 4E and 4F may correspond to one another. FIGS. 4G and 4H may correspond to one another. FIGS. 4I and 4J may correspond to one another. FIGS. 4K and 4L may correspond to one another. FIGS. 4M and 4N may correspond to one another. FIGS. 4O and 4P may correspond to one another. FIGS. 4Q and 4R may correspond to one another. FIGS. 4S and 4T may correspond to one another. FIGS. 4U and 4V may correspond to one another. FIGS. 4W and 4X may correspond to one another. FIGS. 4Y and 4Z may correspond to one another. FIGS. 4AA and 4BB may correspond to one another. FIGS. 4CC and 4DD may correspond to one another. FIGS. 4EE and 4FF may correspond to one another.

As shown in FIGS. 4A, 4C, 4E, 4G, 4I, 4K, 4M, 4O, 4Q, 4S, 4U, 4W, 4Y, 4AA, 4CC, and 4EE, darkened portions of the cross-sectional profiles represent a modulation region 302 of the crystalline material 214 and/or a modulated portion 306 of the working beam 206 propagating through the modulation region 302. Additionally, or in the alternative, darkened portions of the cross-sectional profiles may represent a modulation beam 208 incident upon the crystalline material. Additionally, or in the alternative, a modulated portion 306 of the working beam 206 propagating through the modulation region 302 may have a profile that corresponds to a profile of the modulation region 302. A profile of a modulation beam 208 may be translated to a profile of a working beam based at least in part on a profile of the modulation region 302. Light portions of the beam profile represent a nominal region 304 of the crystalline material 214 and/or a nominal portion 308 of the working beam 206 propagating through the nominal region 304. Any one or more regions of a beam profile may be modulated by a solid-state optical modulator 204.

In some embodiments, a grayscale of the modulation region 302 depicted in the figures may be generally representative of a relative amplitude value. For example, in some embodiments, the amplitude of a modulation beam 208 may be modulated according to a bitmap. The bitmap may have any desired resolution, such as 1 bit resolution, 8 bit resolution, 12 bit resolution, and so forth. By way of example, in some embodiment, the bitmap may have 1 bit per pixel, such that 1 represents a modulated pixel and 0 represents an unmodulated pixel. Additionally, or in the alternative, as a further example, the bitmap may have 8 bits per pixel, such that the amplitude may have 256 different modulation states, including, for example, an unmodulated state, and 255 incremental modulation states. By way of illustration, in the case of a phase shift, the bitmap may correspond to a phase shift of from 0 to 271, for example, such that 0 phase shift corresponds to an unmodulated state and a phase shift of 27 corresponds to $255^{th}$ modulation state. The amplitude of the modulation beam 208 may be modulated by the beam modulator 222, such as by modulating respective addressable elements of the beam modulator 222. The modulation region 302 may have a profile that corresponds to a profile of a modulation beam 208 incident upon the modulation region 302 of the crystalline material 214. While some of the profiles shown in FIGS. 4A-4FF are depicted with 1 bit per pixel and others are depicted with 8 bits per pixel, it will be appreciated that the bitmap resolution depicted, as well as the beam profiles shown, in FIGS. 4A-4FF are provided by way of example and not to be limiting. In fact, any desired beam profile may be provided, including any desired profile and/or any desired number of modulation states.

As shown, for example, in FIGS. 4A-4D and 4E-4H, a modulation region 302 of a crystalline material 214, a modulation beam 208, and/or a modulated portion 306 of a working beam 206 may exhibit a profile that includes an annular region. Additionally, or in the alternative, a nominal region 304 of a crystalline material 214 and/or a nominal portion 308 of a working beam 206 may exhibit a profile that includes an annular region. In some embodiments, the profiles shown in FIGS. 4A-4D and 4E-4H may be used for beam shaping, for example, to generate a flat-top and/or a doughnut-shaped beam profile. A modulation region 302 may include an annular region that surrounds a nominal region 304, and/or a modulated portion 306 may include an annual region that surrounds a nominal portion 308. Additionally, or in the alternative, a nominal region 304 may include an annular region that surrounds a modulation region 302, and/or a nominal portion 308 may include annular region that surrounds a modulated portion 306 of a working beam. A crystalline material 214 may include a plurality of annular regions respectively defined by a modulation region 302 and/or a nominal region 304. A beam profile may include a plurality of annular regions respectively defined by a modulated portion 306 and/or a nominal portion 308 of a working beam 206.

As shown, for example, in FIGS. 4I-4L, a modulation beam 208, a crystalline material 214, and/or a working beam 206 may exhibit a profile that includes a pixelated region. A pixelated region of a crystalline material 214 may include a plurality of modulation regions 302 and/or a plurality of nominal regions 304 disposed about the crystalline material 214 in a pixelated arrangement. A pixelated region of a working beam 206 may include a plurality of modulated portions 306 and/or a plurality of nominal portions 308 disposed about the beam profile in a pixelated arrangement. Additionally, or in the alternative, as shown, for example, in FIGS. 4M-4P, a modulation beam 208, a crystalline material 214, and/or a working beam 206 may exhibit a profile that includes a grated region. A grated region of a crystalline material 214 may include a plurality of modulation regions 302 and/or a plurality of nominal regions 304 disposed about the crystalline material 214 in a grated arrangement, such as in the form of linear or curvilinear regions. A grated region of a working beam 206 may include a plurality of modulated portions 306 and/or a plurality of nominal portions 308 disposed about the working beam 206 in a grated arrangement, such as in the form of linear or curvilinear regions. In some embodiments, a working beam 206 that exhibit a profile which includes a pixelated region and/or a grated region may be utilized for dividing a working beam 206 into a plurality of beam spots and/or lines which may be desirable for certain irradiation operations, such as to augment an energy distribution imparted to a powder material 120 and/or to provide multiple beam spots for parallel and/or sequential irradiation of a respective zone of incidence 238. The pixelated region and/or a grated region may be symmetric (FIGS. 4I and 4J, and FIGS. 4M and N) or asymmetric (FIGS. 4K and 4L and 4O and 4P). A pixelated region and/or a grated region may be provided together with, or as an alternative to, the annular regions described with reference to FIGS. 4A-4D and 4E-4H. For example, an annular region may include a pixelated region and/or grated region.

As shown, for example, in FIGS. 4Q-4T, and 4U-4X, a crystalline material 214 may include a graduated region in which a change in refractive index may exhibit a graduated degree of change in respect of refractive index. Additionally, or in the alternative, a working beam 206 may include a graduated region in which a change to or more beam parameters of the modulated portion 306 relative to a nominal portion 308 may exhibit a graduated degree of change. The graduated degree of change may correspond to a bitmap representing incremental modulation states. The graduated degree of change may be exhibited by the modulated portion 306 with respect to a phase shift, a polarity shift, a change in intensity, a change in intensity distribution, or a change in amplitude, as well as a combination of these. The graduated degree of change may be oriented in any direction or in a plurality of directions. For example, as shown in FIGS. 4Q-4T, a modulation region 302 of a crystalline material 214 may exhibit a graduated region oriented radially, such as increasing in a radially outward orientation (FIGS. 4Q and 4R) and/or in a radially inward orientation (FIGS. 4S and 4T). Additionally, or in the alternative, a modulation beam 208 and/or a modulated portion 306 of a working beam 206 may exhibit a graduated region oriented radially, such as increasing in a radially outward orientation (FIGS. 4Q and 4R) and/or in a radially inward orientation (FIGS. 4S and 4T). The graduated region may extend across an entirety of the crystalline material 214 and/or beam profile (FIGS. 4Q-4T) or across a portion of the crystalline material 214 and/or beam profile (FIGS. 4U-4X). For example, as shown in FIGS. 4U and 4V, a graduated portion may occupy an annular region, and/or as shown in FIGS. 4W and 4X, an annular region may surround a graduated portion. A graduated region may be provided together with, or as an alternative to, a pixelated region and/or a grated region described with reference to FIGS. 4I-4L and 4M-4P respectively, and/or together with or as an alternative to the annular regions described with reference to FIGS. 4A-4D and 4E-4H. For example, an annular region may include a graduated region. Additionally, or in the alternative, a graduated region may include a pixelated region and/or grated region.

As shown, for example, in FIGS. 4Y-4BB and 4CC-4FF, a modulation region 302 and/or a nominal region 304 of a crystalline material 214 may be configured to exhibit photoexcitation that provides a working beam 206 with a beam profile that exhibits any desired geometric shape. For example, a modulated portion 306 and/or a nominal portion 308 of a working beam 206 may exhibit any desired geometric shape. Additionally, or in the alternative, a modulation region 302 and/or a nominal region 304 of a crystalline material 214 may be configured to exhibit photoexcitation that provides a working beam 206 with a beam profile that exhibits a truncated segment. For example, as shown in FIGS. 4Y and 4Z, a modulation region 302 of a crystalline material 214 and/or a modulated portion 306 of a working beam 206 may include a polyhedral region, such as a rectangular region. The polyhedral region may provide a beam profile with a corresponding polyhedral configuration. As shown in FIGS. 4AA and 4BB, a modulation region 302 of a crystalline material 214 and/or a modulated portion 306 of a working beam 206 may exhibit a polyhedral-annular configuration, such as an annular-rectangular configuration. As shown in FIGS. 4CC and 4DD, and FIGS. 4EE and 4FF, a crystalline material 214 may be configured to exhibit photoexcitation that provides a working beam 206 with a beam profile that exhibits one or more truncated segments. The one or more truncated segments may be defined by a modulated portion 306 and/or a nominal portion 308 of the working beam 206. A crystalline material 214 and/or a beam profile of a working beam 206 may include a polyhedral region and/or a truncated segment together with, or as an alternative to, a graduated region described with reference to FIGS. 4Q-4T, and 4U-4X, together with or as an alternative to a pixelated region and/or a grated region described with reference to FIGS. 4I-4L and 4M-4P respectively, and/or together with or as an alternative to the annular regions described with reference to FIGS. 4A-4D and 4E-4H.

In some embodiments, a beam modulator 222 may be configured to provide a modulation beam 208 suitable for providing a working beam 206 with a desired profile according to an interference pattern algorithm. The interference pattern algorithm may be configured to provide a modulation beam 208 with a profile that results in corresponding modulation regions 302 of the crystalline material 214 of the solid-state optical modulator 204 that yield a desired superposition of light waves within the working beam 206. The superposition pattern may result in a desired degree of constructive interference and/or destructive interference. The interference algorithm may utilize computer-generated holography techniques, such as Fourier transform techniques, iterative Fourier transform techniques, point source algorithm techniques, ray tracing algorithm techniques, and the like. The interference algorithm may be configured to determine a profile of a working beam 206 that has a desired phase modulation, such as to achieve a desired irradiation effect when irradiating powder material 120 with the working beam 206. Additionally, or in the alternative, the interference algorithm may be configured to transform a profile of a working beam 206 having a desired phase modulation into a modulation schema for a beam modulator 222. The transformation may include a plurality of intermediate transformations. For example, the transformation may include transforming the profile of the working beam 206 (such as a profile of modulated portions 306 and/or nominal portions 308 of the working beam 206) to a profile of corresponding modulation regions 302 and/or nominal regions 304 of the crystalline material 214. Additionally, or in the alternative, the transformation may include transforming the profile of modulation regions 302 and/or nominal regions 304 of the crystalline material 214 to corresponding profile of a modulation beam 208, and/or transforming the profile of the modulation beam 208 to a corresponding modulation schema of the beam modulator 222. Additionally, or in the alternative, the transformation may combine and/or omit any one or more intermediate transformations while still arriving at a transformation that provides a suitable modulation schema for the beam modulator 222.

Now turning to FIG. 5, and exemplary control system 104 will be described. A control system 104 may be configured to perform one or more control operations associated with an additive manufacturing system 100 and/or an additive manufacturing machine 102. The control operations may include, one or more control commands may be configured to control operations of an energy beam system 134.

Figure 5:
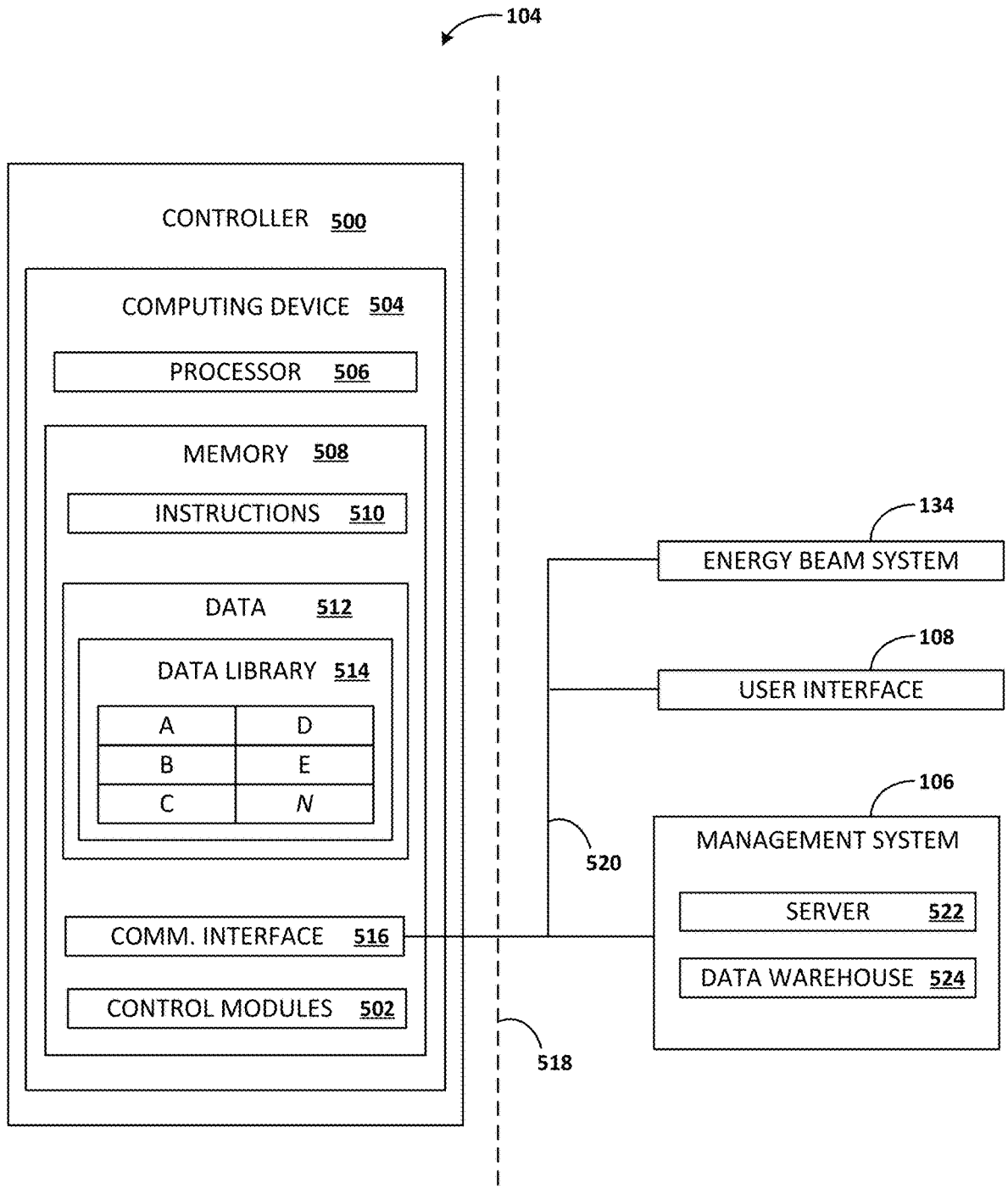
FIG. 5 schematically depicts an exemplary controls system that may be configured to control an additive manufacturing system or machine.

As shown in FIG. 5, an exemplary control system 104 includes a controller 500. The controller may include one or more control modules 502 configured to cause the controller 500 to perform one or more control operations. The one or more control modules 502 may include control logic executable to provide control commands configured to control one or more controllable components associated with an additive manufacturing machine 102, such as controllable components associated with an energy beam system 134 and/or an imaging system 158. For example, a control module 502 may be configured to provide one or more control commands executable to control operation of one or more components of an energy beam system 134 and/or an irradiation device 142, such as a working beam generation device 200, a modulation beam generation device 202, a solid-state optical modulator 204, a beam modulator 222, a power source 218, and/or a temperature control element 220, and/or any one or more other components thereof.

The controller 500 may be communicatively coupled with an additive manufacturing machine 102. The controller 500 may be communicatively coupled with one or more components of an additive manufacturing machine 102, such as one or more components of an energy beam system 134 and/or an irradiation device 142, such as a working beam generation device 200, a modulation beam generation device 202, a solid-state optical modulator 204, a beam modulator 222, a power source 218, and/or a temperature control element 220, and/or any one or more other elements thereof. The controller 500 may also be communicatively coupled with a management system 106 and/or a user interface 108.

The controller 500 may include one or more computing devices 504, which may be located locally or remotely relative to an additive manufacturing machine 102, an energy beam system 134, and/or an irradiation device 142. The one or more computing devices 504 may include one or more processors 506 and one or more memory devices 508. The one or more processors 506 may include any suitable processing device, such as a microprocessor, microcontroller, integrated circuit, logic device, and/or other suitable processing device. The one or more memory devices 508 may include one or more computer-readable media, including but not limited to non-transitory computer-readable media, RAM, ROM, hard drives, flash drives, and/or other memory devices 508.

As used herein, the terms "processor" and "computer" and related terms, such as "processing device" and "computing device", are not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. A memory device 508 may include, but is not limited to, a non-transitory computer-readable medium, such as a random access memory (RAM), and computer-readable nonvolatile media, such as hard drives, flash memory, and other memory devices. Alternatively, a floppy disk, a compact disc-read only memory (CD-ROM), a magneto-optical disk (MOD), and/or a digital versatile disc (DVD) may also be used.

As used herein, the term "non-transitory computer-readable medium" is intended to be representative of any tangible computer-based device implemented in any method or technology for short-term and long-term storage of information, such as, computer-readable instructions, data structures, program modules and sub-modules, or other data in any device. The methods described herein may be encoded as executable instructions embodied in a tangible, non-transitory, computer readable media, including, without limitation, a storage device and/or a memory device. Such instructions, when executed by a processor, cause the processor to perform at least a portion of the methods described herein. Moreover, as used herein, the term "non-transitory computer-readable medium" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The one or more memory devices 508 may store information accessible by the one or more processors 506, including computer-executable instructions 510 that can be executed by the one or more processors 506. The instructions 510 may include any set of instructions which when executed by the one or more processors 506 cause the one or more processors 506 to perform operations, including optical element monitoring operations, maintenance operations, cleaning operations, calibration operations, and/or additive manufacturing operations.

The memory devices 508 may store data 512 accessible by the one or more processors 506. The data 512 can include current or real-time data 512, past data 512, or a combination thereof. The data 512 may be stored in a data library 514. As examples, the data 512 may include data 512 associated with or generated by an additive manufacturing system 100 and/or an additive manufacturing machine 102, including data 512 associated with or generated by the controller 500, an additive manufacturing machine 102, an energy beam system 134, an imaging system 158, a management system 106, a user interface 108, and/or a computing device 504, such as operational data 512 and/or calibration data 512 pertaining thereto. The data 512 may also include other data sets, parameters, outputs, information, associated with an additive manufacturing system 100 and/or an additive manufacturing machine 102.

The one or more computing devices 504 may also include a communication interface 516, which may be used for communications with a communication network 518 via wired or wireless communication lines 520. The communication interface 516 may include any suitable components for interfacing with one or more network(s), including for example, transmitters, receivers, ports, controllers, antennas, and/or other suitable components. The communication interface 516 may allow the computing device 504 to communicate with various nodes on the communication network 518, such as nodes associated with the additive manufacturing machine 102, the energy beam system 134, the imaging system 158, the management system 106, and/or a user interface 108. The communication network 518 may include, for example, a local area network (LAN), a wide area network (WAN), SATCOM network, VHF network, a HF network, a Wi-Fi network, a WiMAX network, a gate-link network, and/or any other suitable communication network 518 for transmitting messages to and/or from the controller 500 across the communication lines 520. The communication lines 520 of communication network 518 may include a data bus or a combination of wired and/or wireless communication links.

The communication interface 516 may allow the computing device 504 to communicate with various components of an additive manufacturing system 100 and/or an additive manufacturing machine 102 communicatively coupled with the communication interface 516 and/or communicatively coupled with one another. The communication interface 516 may additionally or alternatively allow the computing device 504 to communicate with the management system 106 and/or the user interface 108. The management system 106 may include a server 522 and/or a data warehouse 524. As an example, at least a portion of the data 512 may be stored in the data warehouse 524, and the server 522 may be configured to transmit data 512 from the data warehouse 524 to the computing device 504, and/or to receive data 512 from the computing device 504 and to store the received data 512 in the data warehouse 524 for further purposes. The server 522 and/or the data warehouse 524 may be implemented as part of a control system 104 and/or as part of the management system 106.

Now turning to FIG. 6 exemplary methods 600 of additively manufacturing a three-dimensional object will be described. Exemplary methods may be performed at least in part by a control system 104, and/or one or more control modules 502 associated with the control system 104. Additionally, or in the alternative, exemplary methods may be performed at least in part by an additive manufacturing system and/or an additive manufacturing machine 102, for example, by a control system 104 associated therewith.

Figure 6:
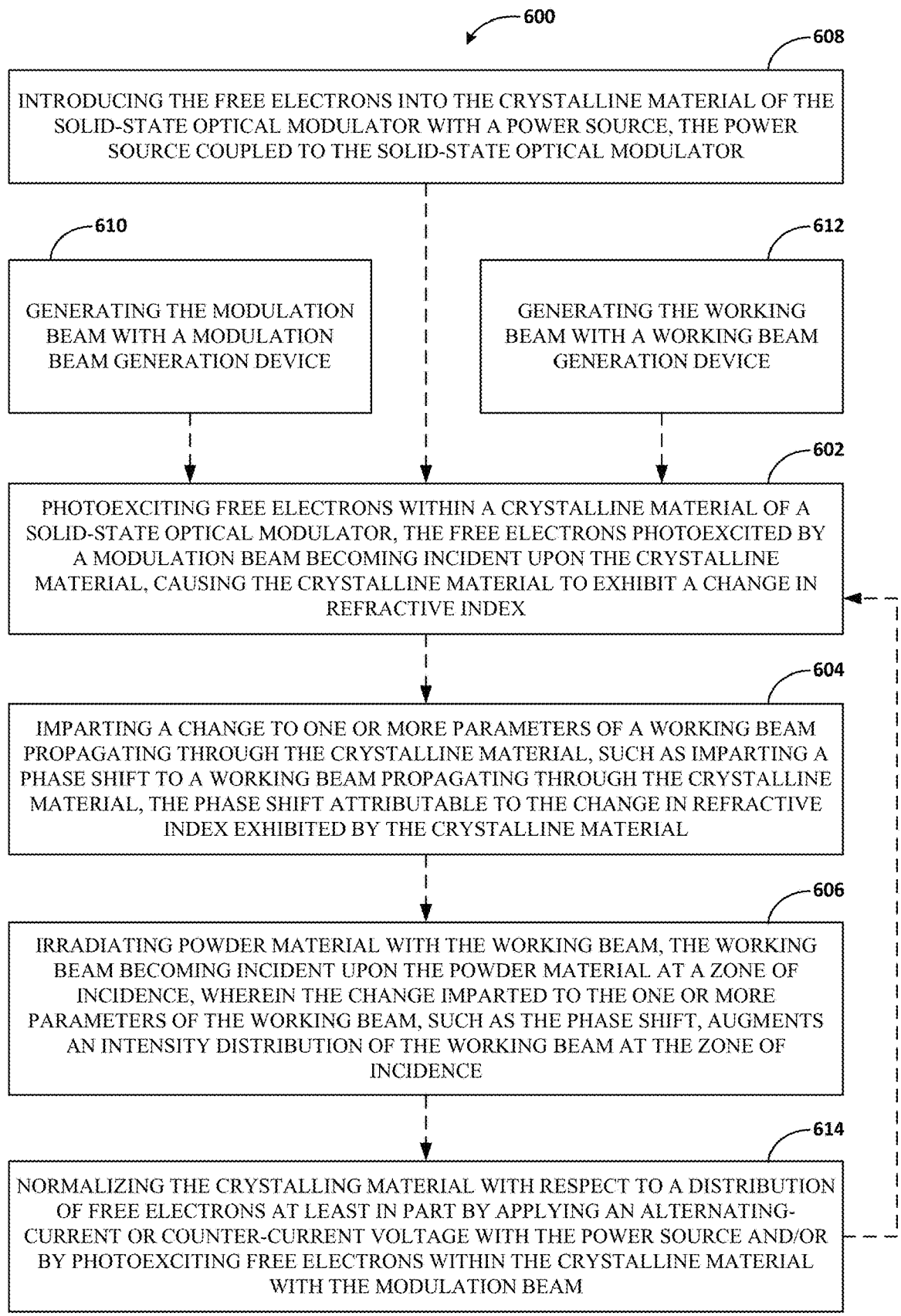
FIG. 6 schematically depicts an exemplary method of additively manufacturing a three-dimensional object.

As shown in FIG. 6, an exemplary method 600 may include, at block 602, photoexciting free electrons 216 within a crystalline material 214 of a solid-state optical modulator 204. The free electrons 216 may be photoexcited by a modulation beam 208 becoming incident upon the crystalline material 214. The photoexcitation of the crystalline material 214 may cause the crystalline material 214 to exhibit a change in refractive index. In some embodiments, photoexciting free electrons 216 within the crystalline material 214 of the solid-state optical modulator 204 may include photoexciting free electrons 216 within a modulation region 302 of the crystalline material 214 of the solid-state optical modulator 204. The free electrons 216 may be photoexcited by the modulation beam 208 becoming incident upon the modulation region 302. The photoexcitation may cause the modulation region 302 to exhibit a change in refractive index relative to a nominal region 304 of the crystalline material 214.

At block 604, an exemplary method 600 may include imparting a change to one or more parameters of a working beam 206 propagating through the crystalline material 214. For example, the method 600 may include imparting a phase shift to the working beam 206 propagating through the crystalline material 214. Additionally, or in the alternative, the method 600 may include imparting a polarity shift, a change in intensity, a change in intensity distribution, or a change in amplitude, as well as a combination of these, to the working beam 206 propagating through the crystalline material 214. The change to the one or more parameters of the working beam 206 may be attributable to the change in refractive index exhibited by the crystalline material 214. In some embodiments, imparting the change to one or more parameters, such as the phase shift, of the working beam 206 propagating through the crystalline material may include imparting the phase shift to a modulated portion 306 of the working beam 206 propagating through the modulation region 302 of the crystalline material 214. The change to the one or more parameters, such as the phase shift, may be determined relative to a nominal portion 308 of the working beam 206 propagating through the nominal region 304 of the crystalline material 214. The change to the one or more parameters, such as the phase shift, may be attributable to the change in refractive index exhibited by the modulation region 302.

At block 606, an exemplary method 600 may include irradiating powder material 120 with the working beam 206, such as powder material defining a powder bed 138. The working beam 206 may become incident upon the powder material 120 at a zone of incidence 238. The change imparted to the one or more parameters of the working beam 206, such as the phase shift, may augment an intensity distribution of the working beam at the zone of incidence 238. For example, the phase shift may cause a modulated portion 306 of the working beam 206 and a nominal portion 308 of the working beam 206 to exhibit superposition that augments an intensity of the working beam 206.

In some embodiments, an exemplary method 600 may include, at block 608, introducing the free electrons 216 into the crystalline material 214 of the solid-state optical modulator 204 with a power source 218 coupled to the solid-state optical modulator 204. Additionally, or in the alternative, an exemplary method 600 may include, at block 610 generating the modulation beam 208 with a modulation beam generation device 202, and/or at block 612, generating the working beam 206 with a working beam generation device 200. At block 614, an exemplary method may include normalizing a distribution of free electrons 216 within the crystalline material at least in part by applying an alternating-current or countercurrent voltage with the power source 218 and/or by photoexciting free electrons within the crystalline material with the modulation beam 208.

Further aspects of the presently disclosed subject matter are provided by the following clauses:

1. An irradiation device for an apparatus for additively manufacturing three-dimensional objects, the irradiation device comprising: a working beam generation device configured to provide a working beam; a modulation beam generation device configured to provide a modulation beam; a solid-state optical modulator comprising a crystalline material that exhibits a change in refractive index in response to photoexcitation of free electrons within the crystalline material; and a power source coupled to the solid-state optical modulator, the power source configured to introduce free electrons into the crystalline material; wherein the modulation beam, when incident upon the crystalline material, causes photoexcitation of the free electrons within the crystalline material, and the photoexcitation of the free electrons within the crystalline material causes the crystalline material to exhibit the change in refractive index; and wherein the working beam, when incident upon the crystalline material, undergoes a phase shift attributable at least in part to the change in refractive index exhibited by the crystalline material.

2. The irradiation device of any clause herein, wherein the working beam, when used to irradiate a powder material, becomes incident upon the powder material at a zone of incidence, and wherein the phase shift causes a change to an intensity distribution of the working beam at the zone of incidence.

3. The irradiation device of any clause herein, comprising a beam modulator disposed upstream from the solid-state optical modulator, the beam modulator configured to modulate at least a portion of the modulation beam.

4. The irradiation device of any clause herein, wherein the modulation beam, when incident upon a modulation region of the crystalline material, causes photoexcitation of the free electrons within the modulation region, and the photoexcitation of the free electrons within the modulation region causing the modulation region to exhibit the change in refractive index relative to a nominal region of the crystalline material.

5. The irradiation device of any clause herein, wherein the working beam comprises a modulated portion that propagates through the modulation region and a nominal portion that propagates through the nominal region, and wherein the change in refractive index exhibited by the modulation region causes the modulated portion of the working beam to undergo a phase shift relative to the nominal portion of the working beam.

6. The irradiation device of any clause herein, wherein the modulated portion and the nominal portion of the working beam exhibit superposition that augments an intensity of the working beam with respect to the modulated portion and the nominal portion being directed upon a powder material when additively manufacturing a three-dimensional object.

7. The irradiation device of any clause herein, comprising: a beam modulator disposed upstream from the solid-state optical modulator, the beam modulator configured to modulate the modulation beam with respect to amplitude and/or phase.

8. The irradiation device of any clause herein, comprising: a beam combiner disposed upstream from the solid-state optical modulator, the beam combiner configured to at least partially align the modulation beam with the working beam; and/or a beam splitter disposed downstream from the crystalline material of the solid-state optical modulator, the beam splitter configured to at least partially split the modulation beam from the working beam.

9. The irradiation device of any clause herein, wherein the solid-state optical modulator comprises a transmissive solid-state optical modulator, a reflective solid-state optical modulator, or a reflective-transmissive solid-state optical modulator.

10. The irradiation device of any clause herein, wherein the solid-state optical modulator comprises a reflective solid-state optical modulator or a reflective-transmissive solid-state optical modulator, and wherein the solid-state optical modulator comprises a highly reflective coating.

11. The irradiation device of any clause herein, wherein the solid-state optical modulator comprises a cathode layer and an anode layer, wherein the power source is coupled to the cathode layer and the anode layer.

12. The irradiation device of any clause herein, wherein the solid-state optical modulator comprises an anti-reflective medium.
13. The irradiation device of any clause herein, wherein the crystalline material exhibits a Kerr effect.
14. The irradiation device of any clause herein, wherein the crystalline material comprises a perovskite-type structure.
15. The irradiation device of any clause herein, wherein the perovskite-type structure comprises one of: potassium tantalate niobate, lithium niobate, lead lanthanum zirconate titanate, lead magnesium niobate-lead titanate, lead zinc niobate-lead titanate, lead scandium niobate-lead titanate.
16. The irradiation device of any clause herein, wherein the perovskite-type structure comprises a dopant, the dopant comprising a metal element and/or a rare-earth element.
17. The irradiation device of any clause herein, wherein the working beam exhibits a wavelength of from 900 nanometers to 1,100 nanometers; and/or wherein the modulation beam exhibits a wavelength of from 315 nm to 750 nm.
18. The irradiation device of any clause herein, wherein the working beam exhibits a power of from 50 watts to 2000 watts; and/or wherein the modulation beam exhibits a power of from 1 milliwatt to 10 Watts.
19. The irradiation device of any clause herein, comprising: a temperature control element configured to heat and/or cool the solid-state optical modulator.
20. The irradiation device of any clause herein, comprising: an upstream beam sensor configured to provide data associated with one or more parameters of the unused portion of the modulation beam, and/or an upstream beam dump configured to absorb energy from at least part of the unused portion of the modulation beam and/or to recycle the unused portion of the modulation beam.
21. The irradiation device of any clause herein, comprising: a downstream beam sensor configured to provide data associated with one or more parameters of the modulation beam, and/or a downstream beam dump configured to absorb energy from at least part of the modulation beam and/or to recycle the modulation beam, after having been utilized by the solid-state optical modulator to modulate the working beam.
22. The irradiation device of any clause herein, comprising: a focusing lens assembly downstream from the solid-state optical modulator, the focusing lens assembly comprising a flat-field lens assembly.
23. A method of additively manufacturing a three-dimensional object, the method comprising: photoexciting free electrons within a crystalline material of a solid-state optical modulator, the free electrons photoexcited by a modulation beam becoming incident upon the crystalline material, causing the crystalline material to exhibit a change in refractive index; and imparting a phase shift to a working beam propagating through the crystalline material, the phase shift attributable to the change in refractive index exhibited by the crystalline material.
24. The method of any clause herein, comprising: irradiating powder material with the working beam, the working beam becoming incident upon the powder material at a zone of incidence, wherein the phase shift causes a change to an intensity distribution of the working beam at the zone of incidence.
25. The method of any clause herein, wherein photoexciting free electrons within the crystalline material of the solid-state optical modulator comprises: photoexciting free electrons within a modulation region of the crystalline material of the solid-state optical modulator, the free electrons photoexcited by the modulation beam becoming incident upon the modulation region, causing the modulation region to exhibit the change in refractive index relative to a nominal region of the crystalline material.
26. The method of any clause herein, wherein imparting the phase shift to the working beam propagating through the crystalline material comprises: imparting the phase shift to a modulated portion of the working beam propagating through the modulation region relative to a nominal portion of the working beam propagating through the nominal region, the phase shift attributable to the change in refractive index exhibited by the modulation region.
27. The method of any clause herein, wherein the modulated portion and the nominal portion of the working beam exhibit superposition that augments an intensity of the working beam.
28. The method of any clause herein, comprising: introducing the free electrons into the crystalline material of the solid-state optical modulator with a power source, the power source coupled to the solid-state optical modulator.
29. The method of any clause herein, comprising: generating the working beam with a working beam generation device.
30. The method of any clause herein, comprising: generating the modulation beam with a modulation beam generation device.
31. method of any clause herein, wherein the method is performed using the irradiation device of any clause herein.
32. A computer-readable medium comprising computer-executable instructions, which when executed by a processor associated with an additive manufacturing machine, causes the additive manufacturing machine to perform a method comprising: photoexciting free electrons within a crystalline material of a solid-state optical modulator, the free electrons photoexcited by a modulation beam becoming incident upon the crystalline material, causing the crystalline material to exhibit a change in refractive index; and imparting a phase shift to a working beam propagating through the crystalline material, the phase shift attributable to the change in refractive index exhibited by the crystalline material.
33. The computer-readable medium of any clause herein, comprising computer-executable instructions, which when executed by a processor associated with an additive manufacturing machine of any clause herein, causes the additive manufacturing machine to perform the method of any clause herein.

This written description uses exemplary embodiments to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An irradiation device for an apparatus for additively manufacturing three-dimensional objects, the irradiation device comprising:
   a working beam generation device configured to provide a working beam;
   a modulation beam generation device configured to provide a modulation beam;
   a solid-state optical modulator comprising a crystalline material that exhibits a change in refractive index in response to photoexcitation of free electrons within the crystalline material; and
   a power source coupled to the solid-state optical modulator, the power source configured to introduce free electrons into the crystalline material;
   wherein the modulation beam, when incident upon the crystalline material, causes photoexcitation of the free electrons within the crystalline material, and the photoexcitation of the free electrons within the crystalline material causes the crystalline material to exhibit the change in refractive index; and
   wherein the working beam, when incident upon the crystalline material, undergoes a phase shift attributable at least in part to the change in refractive index exhibited by the crystalline material.

2. The irradiation device of claim 1, wherein the working beam, when used to irradiate a powder material, becomes incident upon the powder material at a zone of incidence, and wherein the phase shift causes a change to an intensity distribution of the working beam at the zone of incidence.

3. The irradiation device of claim 1, comprising a beam modulator disposed upstream from the solid-state optical modulator, the beam modulator configured to modulate at least a portion of the modulation beam.

4. The irradiation device of claim 3, wherein the modulation beam, when incident upon a modulation region of the crystalline material, causes photoexcitation of the free electrons within the modulation region, and the photoexcitation of the free electrons within the modulation region causing the modulation region to exhibit the change in refractive index relative to a nominal region of the crystalline material.

5. The irradiation device of claim 4, wherein the working beam comprises a modulated portion that propagates through the modulation region and a nominal portion that propagates through the nominal region, and wherein the change in refractive index exhibited by the modulation region causes the modulated portion of the working beam to undergo a phase shift relative to the nominal portion of the working beam.

6. The irradiation device of claim 5, wherein the modulated portion and the nominal portion of the working beam exhibit superposition that augments an intensity of the working beam with respect to the modulated portion and the nominal portion being directed upon a powder material when additively manufacturing a three-dimensional object.

7. The irradiation device of claim 1, comprising:
   a beam modulator disposed upstream from the solid-state optical modulator, the beam modulator configured to modulate the modulation beam with respect to amplitude and/or phase.

8. The irradiation device of claim 1, comprising:
   a beam combiner disposed upstream from the solid-state optical modulator, the beam combiner configured to at least partially align the modulation beam with the working beam;
   and/or a beam splitter disposed downstream from the crystalline material of the solid-state optical modulator, the beam splitter configured to at least partially split the modulation beam from the working beam.

9. The irradiation device of claim 1, wherein the solid-state optical modulator comprises a transmissive solid-state optical modulator, a reflective solid-state optical modulator, or a reflective-transmissive solid-state optical modulator.

10. The irradiation device of claim 9, wherein the solid-state optical modulator comprises a reflective solid-state optical modulator or a reflective-transmissive solid-state optical modulator, and wherein the solid-state optical modulator comprises a highly reflective coating.

11. The irradiation device of claim 1, wherein the solid-state optical modulator comprises a cathode layer and an anode layer, wherein the power source is coupled to the cathode layer and the anode layer.

12. The irradiation device of claim 1, wherein the solid-state optical modulator comprises an anti-reflective medium.

13. The irradiation device of claim 1, wherein the crystalline material exhibits a Kerr effect.

14. The irradiation device of claim 1, wherein the crystalline material comprises a perovskite-type structure.

15. The irradiation device of claim 14, wherein the perovskite-type structure comprises one of: potassium tantalate niobate, lithium niobate, lead lanthanum zirconate titanate, lead magnesium niobate-lead titanate, lead zinc niobate-lead titanate, lead scandium niobate-lead titanate.

16. The irradiation device of claim 14, wherein the perovskite-type structure comprises a dopant, the dopant comprising a metal element and/or a rare-earth element.

17. The irradiation device of claim 1, wherein the working beam exhibits a wavelength of from 900 nanometers to 1,100 nanometers; and/or wherein the modulation beam exhibits a wavelength of from 315 nm to 750 nm.

18. The irradiation device of claim 1, wherein the working beam exhibits a power of from 50 watts to 2000 watts; and/or wherein the modulation beam exhibits a power of from 1 milliwatt to 10 Watts.

* * * * *